(12) United States Patent
Sauer et al.

(10) Patent No.: US 12,467,969 B2
(45) Date of Patent: Nov. 11, 2025

(54) AUTOMATED TEST EQUIPMENT AND METHOD USING DEVICE SPECIFIC DATA

(71) Applicant: ADVANTEST CORPORATION, Tokyo (JP)

(72) Inventors: Matthias Sauer, Böblingen (DE); Olaf Pöppe, Tübingen (DE); Klaus-Dieter Hilliges, Stuttgart (DE)

(73) Assignee: ADVANTEST CORPORATION, Tokyo (JP)

( * ) Notice: Subject to any disclaimer, the term of this patent is extended or adjusted under 35 U.S.C. 154(b) by 0 days.

(21) Appl. No.: 18/074,325

(22) Filed: Dec. 2, 2022

(65) Prior Publication Data
US 2023/0100093 A1    Mar. 30, 2023

Related U.S. Application Data

(63) Continuation of application No. PCT/EP2020/070600, filed on Jul. 21, 2020.

(51) Int. Cl.
*G01R 31/28*    (2006.01)
*G01R 13/02*    (2006.01)
(Continued)

(52) U.S. Cl.
CPC ......... *G01R 31/2834* (2013.01); *G01R 13/02* (2013.01); *G01R 31/287* (2013.01); *G01R 31/31905* (2013.01); *H04L 43/50* (2013.01)

(58) Field of Classification Search
CPC ............ G11C 29/26; G11C 2029/2602; G11C 2029/0401; G11C 29/56; G11C 29/48; G11C 2029/5602; G01R 31/31905; G01R 31/2851; G01R 31/2834; G01R 31/287; G01R 31/31917; G01R 31/31908; G01R 13/02; G01R 13/029; G01R 31/3177; H04L 43/50

See application file for complete search history.

(56) References Cited

U.S. PATENT DOCUMENTS 5,581,491 A    12/1996    Biwer et al.
2003/0016738 A1    1/2003    Boolos et al.
(Continued)

FOREIGN PATENT DOCUMENTS

JP    H07325130    12/1996
JP    2003161752    6/2003
(Continued)

*Primary Examiner* — Cynthia Britt
(74) *Attorney, Agent, or Firm* — Squire Patton Boggs LLP; Sarah Mirza

(57) ABSTRACT

An automated test equipment comprises a tester control configured to broadcast and/or specific upload to matching module input data and/or device-specific data including keys and/or credentials and/or IDs and/or configuration information. The automated test equipment further comprises a channel processing unit configured to transform input data using device specific data in order to obtain device-under-test adapted data for testing the device under test. The channel processing unit further configured to process the DUT data using device specific data in order to evaluate the DUT data. A method and a computer program for testing one or more devices under test in an automated test equipment are also disclosed.

23 Claims, 20 Drawing Sheets

(51) Int. Cl.
*G01R 31/319* (2006.01)
*H04L 43/50* (2022.01)

(56) References Cited

U.S. PATENT DOCUMENTS

| | | |
|---|---|---|
| 2008/0034266 A1 | 2/2008 | Kang et al. |
| 2010/0011252 A1 | 1/2010 | Rivoir et al. |
| 2010/0037108 A1 | 2/2010 | Choi |
| 2011/0218752 A1* | 9/2011 | Watanabe ...... G01R 31/318511 702/82 |
| 2016/0011262 A1* | 1/2016 | Werner .......... G01R 31/318563 714/727 |
| 2016/0313370 A1* | 10/2016 | Neeb ....................... G01R 1/025 |
| 2018/0156870 A1* | 6/2018 | Kim ..................... G01R 31/286 |
| 2018/0348299 A1* | 12/2018 | Mistry ............. G01R 31/31908 |
| 2019/0271719 A1* | 9/2019 | Sterzbach .......... G01R 31/2886 |

FOREIGN PATENT DOCUMENTS

| | | |
|---|---|---|
| JP | 2005-346902 A | 12/2005 |
| JP | 2007033248 | 2/2007 |
| JP | 2007206067 | 8/2007 |
| JP | 2008-047555 A | 2/2008 |
| JP | 2010252305 | 11/2010 |
| TW | 201000924 A | 1/2010 |
| TW | 201413267 A | 4/2014 |

\* cited by examiner

AUTOMATED TEST EQUIPMENT AND METHOD USING DEVICE SPECIFIC DATA

CROSS-REFERENCE TO RELATED APPLICATIONS

This is a continuation of PCT Patent Application No. PCT/EP2020/070600 filed Jul. 21, 2020, which is incorporated herein in its entirety.

TECHNICAL FIELD

Embodiments according to the present invention are related to an automated test equipment, for example, for multi-site tests. Another embodiment according to the invention is related to a method for testing devices under test. Another embodiment according to the invention is related to a computer program for performing said method.

Generally speaking, embodiments according to the invention are related to providing an efficient and a secure device specific communication for a multi-site testing. Moreover, embodiments according to the invention are related to an Automated Test Equipment and a Method for Providing an Efficient and a Secured Device-Specific Communication for a Multi-Site Testing.

BACKGROUND OF THE INVENTION

For conventional device testing concepts, an automated test equipment is typically used for testing a device-under-test (DUT). A test interface between the device-under-test and the automated test equipment may use different communication protocols, such as, iJTAG, RSN or IEEE 1687. It has been recognized that while performing testing, a test program may be identical for all DUTs, however, a test execution and a test data may not be identical. In this framework, a multi-site test is a well-known approach to test multiple DUTs in parallel which, for example, reduces total test time and therefore cost. It has been found that meanwhile, the multi-site test efficiency is threatened, for example, due to (high) computing-efforts required for the data stream computation. It has also been found that other threats may, for example, be the limited broadcast efficiency due to the device-specific communication and the direct device interaction over protected, packetized or the like interfaces.

Furthermore, the conventional device testing concepts use a centralized processing unit comprising the memory and the computing units. It has been found that in the centralized channel architecture, data needs to be transported and computed on the central processing unit which cannot perform local data transformations (e.g., device-specific, DUT specific) which in turn causes high communication overhead for device specific communication.

Techniques that disclose about a device specific communication using a channel processing unit have been proposed. For example, in US 2018/0196103 A1 an automated test equipment system that is capable of performing a test of semiconductor devices is disclosed. JP 2009508142A discloses a tester for testing a device-under-test. In US 2019/0383873 A1 a test and a measurement device for testing multiple DUTs is disclosed. US 2004/0044939 A1 discloses a system for testing different types of semiconductor devices.

On view of this situation, there is a need for a test concept which provides for an improved tradeoff between complexity, test throughput and safety.

SUMMARY OF THE INVENTION

An embodiment according to the invention provides an automated test equipment for testing one or more devices under test (DUTs), comprising a tester control. The tester control comprises, for example, a centralized test flow management which is configured to broadcast and/or specifically upload to matching modules the device-specific data which may include keys and/or credentials and/or IDs and/or a configuration information. For example, the tester control broadcasts the same data simultaneously to the plurality of attached channel processing units.

Moreover, the centralized test flow management may, for example, be configured to broadcast and/or specifically upload to matching modules input data (e.g., an incoming tester command stream, or a DUT stream or a broadcast data or a shared data or data equal for different DUTs or a common expected result data).

The automated test equipment further comprises a channel processing unit which is, for example, coupled to the tester control via a tester data bus. Furthermore, the channel processing unit is configured to transform (or process) input data (e.g., an incoming tester command stream, or a DUT stream or broadcast data or shared data or data equal for different DUTs or a common expected result data) using local device specific data (e.g. local device-specific information and/or keys and/or credentials and/or IDs and/or a configuration), in order to obtain device-under-test adapted data (e.g., protocol-aware data or data adapted to an individual device-under-test or expected result data adapted to a device-under-test) for testing the device-under-test (e.g. for provision to the device-under-test or for evaluation of response data from the device-under-test).

Alternatively or in addition, the channel processing unit is configured to process (e.g., transform or analyze or decrypt using device-specific key or unwrap from protocol using device-specific protocol information, like packet counters, device ID) DUT data (e.g., from a DUT; e.g. data using a protocol that is determined by device specific data, like a device-specific key) using (e.g., local) device-specific data, in order to test or evaluate a DUT (e.g., by extracting a communication payload or by evaluating a data transmission from the DUT, or to obtain a device-independent or non-DUT-specific information). Accordingly, the device-specific data (e.g., keys and/or credentials and/or IDs and/or configuration) is, for example, configured to be stored in local memory (e.g., local memory of the channel processing unit).

The described automated test equipment is based on the finding that an excessive limitation of a test throughput in an automated test equipment, which is caused by a limitation of a bandwidth between a tester control and a channel processing unit, can be overcome using a device-specific processing in one or more channel processing units.

Accordingly, by transforming input data of a channel processing unit, which may be provided by the tester control, using device specific data stored locally in the channel processing unit (or even using different device specific data stored in different channel processing units), it is possible to obtain device-specific device-under-test adapted data for testing different devices under test in an automated test equipment comprising a plurality of channel processing units while avoiding a transmission of excessive data volumes to the different channel processing units.

For example, by performing a device-specific adaptation of test data in the channel processing units using the device specific data, it is no longer necessary to forward different (device-specifically adapted) test data to the channel processing units, but rather may be sufficient to transfer common (identical) test data and a (comparatively) small volume of device specific data to the channel processing units, wherein the common test data may, for example, be broadcast (e.g. in a bandwidth saving manner) to the channel processing units. Accordingly, an amount of data to be transferred from the tester control to the channel processing units may be much smaller than in conventional solutions in which individual (device-specifically adapted) test data for all devices under test are transferred from the tester control to the channel processing units.

Similarly, by using device specific data for an evaluation of DUT data in the channel processing unit, it is no longer necessary to communicate different device-specific verify data (describing expected DUT data) to the channel processing units or to forward the full DUT data to the tester control for evaluation. Rather, an amount of data to be transferred from the channel processing units to the tester control can be reduced by using device-specific data (which may comprise a comparatively small data volume) stored locally in the channel processing unit (possibly together with common data, commonly used for an evaluation of DUT data of different devices under test) for an evaluation of DUT data from the DUT. For example, the device-specific data may be used to decrypt DUT data and/or to implement DUT-specific communication protocols.

Moreover, by storing device-specific data directly in the channel processing unit, a high degree of security and confidentiality may be achieved. For example, storing the device-specific data in the channel processing unit may achieve more savings than storing the device-specific data in the tester control, since the chancel processing units are less likely to be subject to attacks due to their typically very specific embedded architecture.

Moreover, it has been found that implementing processing using device-specific data in the channel processing units is typically easy to implement in view of the processing power available in the channel processing units. Moreover, the channel processing units are often better adapted for real-time (or just-in-time) processing than the tester control, such that a processing effort can be handled.

To conclude, the above discussed concept can provide a good tradeoff between complexity, test throughput and safety.

Furthermore, the described automated test equipment is also based on the finding that the concept is efficient in the context of a secure communication approach which may be helpful to achieve secure multi-site DUT testing by using an advanced security architecture. Security mechanisms may involve, for example, encrypted/decrypted DUT (device specific) communication in order to prevent the test and the debug interfaces from unauthorized access to internal device structures. Moreover, the functional interfaces that are still active after test may require protection. Further security mechanisms may, for example, be an authorization which refers to granting certain level of access, (e.g., only certain specific tests may, for example, be applied to DUTs), or an authentication which refers to, for example, confirming the identity of users. Moreover, the communication between the DUT and the channel processing unit may further be protected by using, for example, packet counters and/or error correction codes and/or error identification codes. This ensures the highest possible security in the context of multi-site testing. Accordingly, using the concept described above, a device specific processing (e.g. a transform of input data of the channel processing unit using device-specific data, e.g. device-specific encryption information or authorization information) may be performed in the channel processing unit, which may reduce a processing load of the tester control and an amount of data to be transferred from the tester control to the channel processing unit or vice versa and which may improve a security by having secret information stored in the channel processing unit, which may be less prone to security attacks than the tester control.

Further, the invention allows an efficient device-specific communication wherein the communication between the tester control and the channel processing unit is performed as device-agnostic as possible. For example, this may be achieved by the result analysis approach wherein the input data is broadcasted by the tester control to different channel processing units via the tester data bus. In different channel processing units, the input data may be compared with the respective (e.g., extracted) result data from the DUT and the respective test results are stored in the memory. In case, the respective test result (upstream result data) is different from the input data, the respective test result data and/or the difference between the input data and the respective test result data may, for example, be compressed and transmitted to the tester control. The data to be transmitted to the tester control may additionally (or optionally) include a DUT signature. To conclude, the result analysis approach on the channel processing unit may minimize both the test time by reducing the bus traffic and the CPU requirements.

Further efficiency and security may, for example, be achieved with a sandboxed channel processing unit which provides local execution of tester commands with its individual memory and computing capability in the channel processing unit; thus, a device-specific functionality may also be updated by uploading a third-party software in order to enable efficient device-specific computation steps.

In a preferred embodiment, the channel processing unit is configured to communicate with one of the one or more DUTs by means of a device specific channel and a DUT interface. This is accomplished in order to communicate the device-under-test-adapted data to the device-under-test, and/or to receive the DUT data from the device-under-test. The said DUT interfaces may, for example, be one of the iJTAG interface (IEEE 1687 interface), RSN interface, Debug, one of the high bandwidth interfaces such as IEEE 1149.10 interface, SATA interface, USB interface, or the like.

In a preferred embodiment, the channel processing unit is configured to communicate with the central tester control using a tester interface (e.g., a data bus or an interface or a proprietary bus). The tester interface may, for example, be one of the iJTAG interface (IEEE 1687 interface), RSN interface, Debug, one of the high bandwidth interfaces such as IEEE 1149.10 interface, SATA interface, USB interface or the like. However, any other types of interfaces, like fast parallel interfaces or Ethernet interfaces may also be used.

In a preferred embodiment, the tester control is configured to broadcast input data to a plurality of channel processing units via the tester interface. In case of broadcasting input data (e.g., an incoming tester command stream, a DUT stream, a broadcast data, a shared data or a data equal for different DUTs or a common expected result data), the same input data may be transmitted to the plurality of channel processing units. Also, the broadcast may be significantly more bandwidth efficient than an individual transmission of the same data to different channel processing unit, and even much more bandwidth efficient than an individual transmission of different (device-specific) data to different channel processing units.

In a preferred embodiment, the tester interface is a tester data bus, which is coupled to the tester control and to a plurality of channel processing units. In particular, equal data, which may be adapted in a device-specific manner by the device communication units, can be efficiently transferred from the tester control to the device communication units via such a tester data bus.

In a preferred embodiment, the channel processing unit comprises a volatile storage (e.g., a memory) and/or a non-volatile storage (e.g., a solid-state disk) and a computing unit (e.g., CPU, ASIC, FPGA). Moreover, the channel processing unit is configured to store the device-specific data in the storage of the channel processing unit, and transform the input data, sent from the tester control, using the computing unit. For example, the input data may be transformed into device-under-test-adapted data by using the device-specific data. Alternatively or in addition, the channel processing unit is configured to process the DUT data, e.g., sent from the DUT, using the computing unit. The DUT data processing comprises, for example, data compression and/or data encryption and/or inclusion of generated signature or the like.

By storing the device-specific data in the memory of the channel processing unit and by using it for the generation of device specific test data, which may be performed before a DUT test or even "on-the-fly" during a DUT test, the need for an exchange of a large amount of device-specific test data between the tester control and the device communication unit may be overcome. Rather, only a comparatively small amount of device-specific data may need to be uploaded from the tester control to the device communication unit, and the device communication unit may generate a comparatively large amount of device-under-test adapted data using its own computing unit (e.g., on the basis of device-agnostic common test data). Similarly, the channel processing unit may, for example, extract device-agnostic result data using the device specific data, for example by decompressing or decrypting DUT data received from the device under test, wherein this "device agnostic" result data may, for example, be used to classify a device under test as passing or failing the test. Thus, a processing load of the tester control may be kept low, and an amount of data to be transferred via the tester interface may be kept small, thus avoiding bottlenecks.

In a preferred embodiment, the channel processing unit comprises one or more sandboxes and the sandboxes are, for example, configured to execute commands with individual memory and individual computing capability. In other words, a sandbox is, for example, a virtual environment to execute their own commands and use their own data. Furthermore, the one or more sandboxes may, for example, be configured to transform the input data using the device-specific data and/or analyze results received from the DUT (e.g. with individual computing capability). For example, the usage of sandboxes may provide the channel processing units to perform one or more programs, which may be adapted to the device under test, in a secure manner. For example, the programs run in the sandbox may be provided by a user of the automated test equipment, rather than by the manufacturer of the automated test equipment, and may, for example, perform the above mentioned transform of input data using the device specific data without having a risk to disturb fundamental functionalities of the channel processing unit. In other words, the sandboxes may, for example, "isolate" said user-provided programs, which may be adapted to the devices under test, from the other functionalities of the channel processing unit (wherein a well-controlled data exchange may still be possible). Thus, one or more user-provided programs may be safely run in the one or more sandboxes of the channel processing unit, to perform a device-specific processing of data to be provided to the DUT, and/or of data received from the DUT.

In a preferred embodiment, the channel processing unit comprises a plurality of sandboxes wherein the sandboxes are configured to communicate with a hosting channel processing unit using one or more protected interfaces, such that different sandboxes are isolated (separated) from each other. This provides for a high degree of security and stability.

In a preferred embodiment, the channel processing unit comprises one or more sandbox(es), wherein the sandboxes are configured to execute a device specific functionality using the device-specific data (e.g., an encryption of input data, input data common to a plurality of DUTs, using a device-specific encryption key or device-specific credentials, or a decryption of DUT data using a device-specific decryption key or device-specific credentials, or a processing of input data or DUT data using other device-specific information, like a device-specific identifier). Thus, the sandboxes can support the device-specific processing.

In a preferred embodiment, the automated test equipment is configured to upload a software to one or more sandboxes, to allow for a device-specific processing of the input data or of the DUT data using the sandbox. Accordingly, a device-specific functionality can be updated by uploading from a third-party software in order to enable efficient device-specific computation steps (e.g., communication with the specific DUT interfaces knowing the device configuration).

In a preferred embodiment, the channel processing unit is configured to implement a device-specific communication protocol using the device-specific data, in order to protect (e.g., using encryption/decryption, and/or using an error detection mechanism and/or using an error correction mechanism and/or using an authentication mechanism) a communication (e.g., a uni-directional communication or a bi-directional communication) between the channel processing unit and the device-under-test. Thus, individual test access to security-critical devices under test may be achieved without compromising security and without having excessive load on an interface between the tester control and the device communication units.

Moreover, the protocol communicating with the respective DUT is, for example, programmable in hardware (HW) or software (SW) and is therefore reconfigurable. In case protocol-aware testing is performed, efficient tracing of the protocol's state may be required. The communication between the device-under-test and the channel processing unit may be protected by one or more of said methods. The channel processing unit may, for example, detect errors and correct the correctable errors. The error detection mechanism may, for example, be a cyclic redundancy check. The error correction mechanism may, for example, be or comprise a forward error correction code of Viterbi decoding or a block code.

In a preferred embodiment, the channel processing unit comprises a computing unit, wherein the computing unit (CPU, ASIC, FPGA) is configured to interact with one or more DUT interfaces. Furthermore, the computing unit is configured to device-specifically encrypt the input data (e.g., of the device communication unit), in order to obtain the device-under-test adapted data, and/or to device-specifically decrypt the DUT data, and/or to perform error detection (e.g., error identification) on the DUT data (i.e., detecting errors on the DUT data), and/or to perform error correction on the DUT data (i.e., enabling reconstruction of the original DUT data sent from the DUT), and/or to implement a communication protocol using one or more packet counters, in order to obtain the device-under-test adapted data or in order to evaluate the DUT data, and/or to implement a communication protocol using one or more device specific or device-unique identifiers, in order to obtain the device-under-test-adapted data or in order to evaluate the DUT data. By implementing one or more such functionalities on the channel processing unit, the load of the tester control (which may, for example, coordinate a testing of multiple devices under test using multiple channel processing units) is reduced, and data volume on a tester interface may be kept reasonably small.

In a preferred embodiment, the channel processing unit comprises a computing unit, wherein the computing unit (CPU, ASIC, FPGA) is configured to implement the communication protocol in HW (ASIC/FPGA) and/or SW. In other words, the channel processing unit may be configured to communicate with a DUT by a specific protocol that the respective DUT supports, wherein the specific protocol is programmable in HW or SW of the computing unit. Both hardware and software solutions have their specific advantages. While a hardware implementation is typically faster, and may be necessary to accommodate the needs of very high bandwidth communication interfaces, a software implementation is typically more flexibly configurable.

In a preferred embodiment, the tester control (e.g. a security credentials unit and/or keys unit, which may be part of the tester control) is configured to obtain (e.g., receive, or generate) security credentials and/or keys and broadcast the security credentials and/or keys to the one or more channel processing units and/or to specifically upload the security credentials and/or keys to matching channel processing units (e.g., in an encrypted form). Accordingly, an efficient centralized distribution of the security credentials or keys may be achieved, which facilitates the usage of the automated test equipment in a test environment. On the other hand, by using secure communication between the tester control and the channel processing units at least for the credentials or keys, confidentiality may be ensured.

In a preferred embodiment, the tester control (e.g., a security credentials unit and/or keys unit) is configured to obtain (generate) security credentials and/or keys (e.g., automatic test equipment specific security credentials or keys, like a public key of the automated test equipment) and broadcast to one or more DUTs.

In a preferred embodiment, a communication protocol implementation in the channel processing unit is configured to use (consider) one or more of the following items: one or more packet counters; handshake with device-specific contents (e.g., device ID); synchronous communication including timestamp; and/or implementation of communication standards (e.g. IEEE 1687.x, IEEE 1500, IEEE 1149.x). Accordingly, a communication which is adapted to the specific DUT can be established. Protocol needs of the individual DUT (like packet counters device ID, security certificates or signatures, and the like), can be considered without having excessive bandwidth need in the communication between the tester control and the channel processing units.

In a preferred embodiment, the channel processing unit is configured to store upstream result data (e.g., the DUT data from the device-under-test) and/or to analyze upstream result data (e.g., using expected result data, e.g., compare with the expected result data). The analysis on the upstream result data is to specify if there is a difference between the upstream result data and the expected result data in which the difference may reflect the production defects on the respective DUT. The channel processing unit is further configured to pre-process (e.g., compress) the upstream result data, and/or transmit (forward) the pre-processed and/or compressed upstream result data to the tester control via the tester interface. Accordingly, a test result may be obtained with low load of the tester control and of the tester interface.

In a preferred embodiment, the automated test equipment comprises a plurality of channel processing units, wherein the tester control is configured to provide common data to the plurality of channel processing units (e.g., simultaneously, e.g., using a broadcast, e.g., via the tester data bus). In other words, the tester control broadcasts the same (common) data simultaneously to the plurality of attached channel processing units.

Furthermore, different channel processing units are, for example, configured to transform the common data into different device-under-test adapted data for different devices under test using different device specific data associated with the different devices under test. Moreover, different channel processing units are configured to use different device-under-test adapted data for testing the different devices under test. Accordingly, common data, which is adapted to the specific devices under test in the channel processing units, can be forwarded in a bandwidth-efficient manner, thereby keeping a load on the tester interface low.

In a preferred embodiment, the tester control is configured to provide common stimulus data (e.g., a central data stream, which may, for example, define signals to be output to the devices under test, except for device-under-test specific characteristics, like device-specific encryption, device-specific identifiers, device-specific configuration) to a plurality of channel processing units. Moreover, the channel processing units are configured to transform the common stimulus data using local device specific data. Thus, an efficient simultaneous testing of multiple devices under test is possible while avoiding the tester interface as a bottleneck.

In a preferred embodiment, the channel processing units are configured to transform the common stimulus data using local device specific data or device-unique data in order to provide for a device-specific communication (e.g., encrypted in a device-specific or device-unique manner, or using a device-unique key, or device-unique credentials) (e.g., adapted to individual devices). Thus, individual characteristics, like credentials, key, certificated, device ids and the like, of the devices under test can be efficiently considered.

In a preferred embodiment, the automated test equipment comprises a plurality of channel processing units, wherein the tester control is configured to provide common expected result data to the plurality of channel processing units (e.g., simultaneously, e.g., using a broadcast, e.g., via the tester data bus). Furthermore, the different channel processing units are configured to obtain respective test results associated with the respective devices under test using the common expected result data. Accordingly, the channel processing units may determine test results in a decentralized manner, avoiding a transmission of the full DUT data to the tester control. Device-individual characteristics may be considered in the evaluation using the device-specific data, which may also be uploaded to the channel processing units from the tester control in advance of the evaluation of test results. The device-specific data may, for example, be used to decrypt DUT data from the DUT, or to establish a trusted connection with the DUT, or to evaluate a communication protocol used by the DUT.

In a preferred embodiment, the automated test equipment comprises a plurality of channel processing units, wherein the tester control is configured to provide common expected result data to the plurality of channel processing units (e.g. simultaneously, e.g., using a broadcast, e.g., via the tester data bus). Moreover, the different channel processing units are configured to extract respective result data from respective DUT data from different devices under test using different device-specific data associated with the different devices under test, and to compare the respective result data with the common expected result data, in order to obtain respective test results associated with the respective devices under test. Thus, a decentralized processing of DUT data can be performed, avoiding bottlenecks.

Embodiments provide a method for testing one or more devices under test in an automated test equipment comprising a tester control and a channel processing unit. The method comprises transforming, in the channel processing unit, input data (e.g. a DUT stream; incoming tester command stream or broadcast data or shared data or data equal for different DUTs or common expected result data) using local device-specific data (local device-specific information and/or keys and/or credentials and/or IDs and/or configuration), in order to obtain device-under-test adapted data (e.g., protocol-aware data or data adapted to an individual device-under-test or expected result data adapted to a device-under-test) for testing the device-under-test (e.g., for provision to the device-under-test or for evaluation of response data from the device-under-test). The method further comprises processing, in the channel processing unit, (e.g., transform or analyze or decrypt using device-specific key or unwrap from protocol using device-specific protocol information, like packet counters, device ID) DUT data from a DUT; (e.g., data using a protocol that is determined by device-specific data, like a device-specific key) using local device-specific data, in order to test and evaluate a DUT (extract a communication payload or evaluate a data transmission from the DUT) to obtain a device-independent or non-DUT-specific information.

However, it should be noted that the method described here may optionally be supplemented by any of the features, functionalities and details disclosed herein, also with respect to the automated test equipment. It should be noted that the method may optionally be supplemented by such features, functionalities and details both individually and taken in combination.

BRIEF DESCRIPTION OF THE FIGURES

Embodiments according to the present invention will subsequently be described taking reference to the enclosed figures in which.

DETAILED DESCRIPTION OF THE FIGURES

Figure 1A:
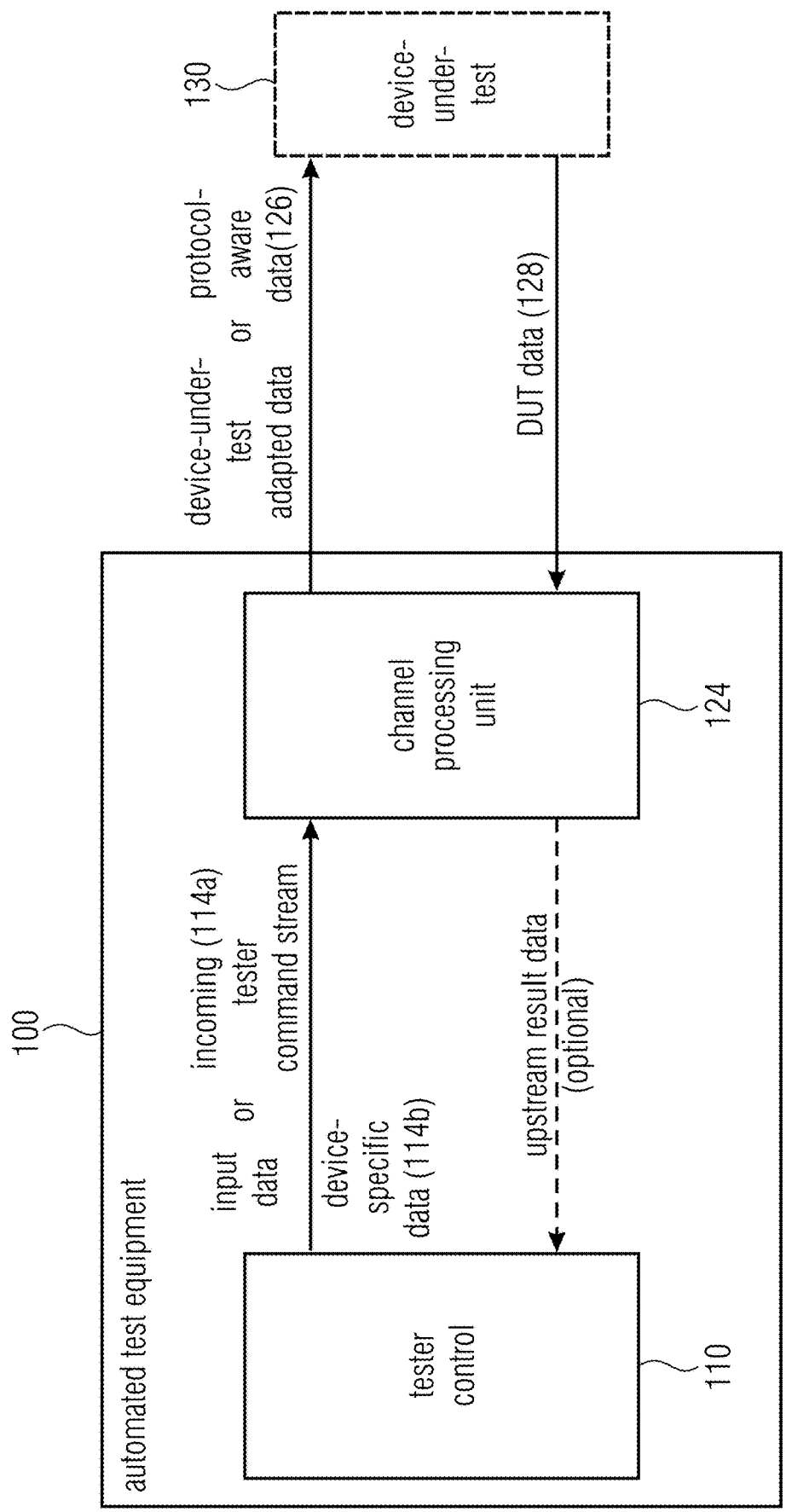
FIG. 1A shows a block schematic diagram of an automated test equipment for providing device-specific communication to a device-under-test, according to an embodiment of the invention.
Figure 1B:
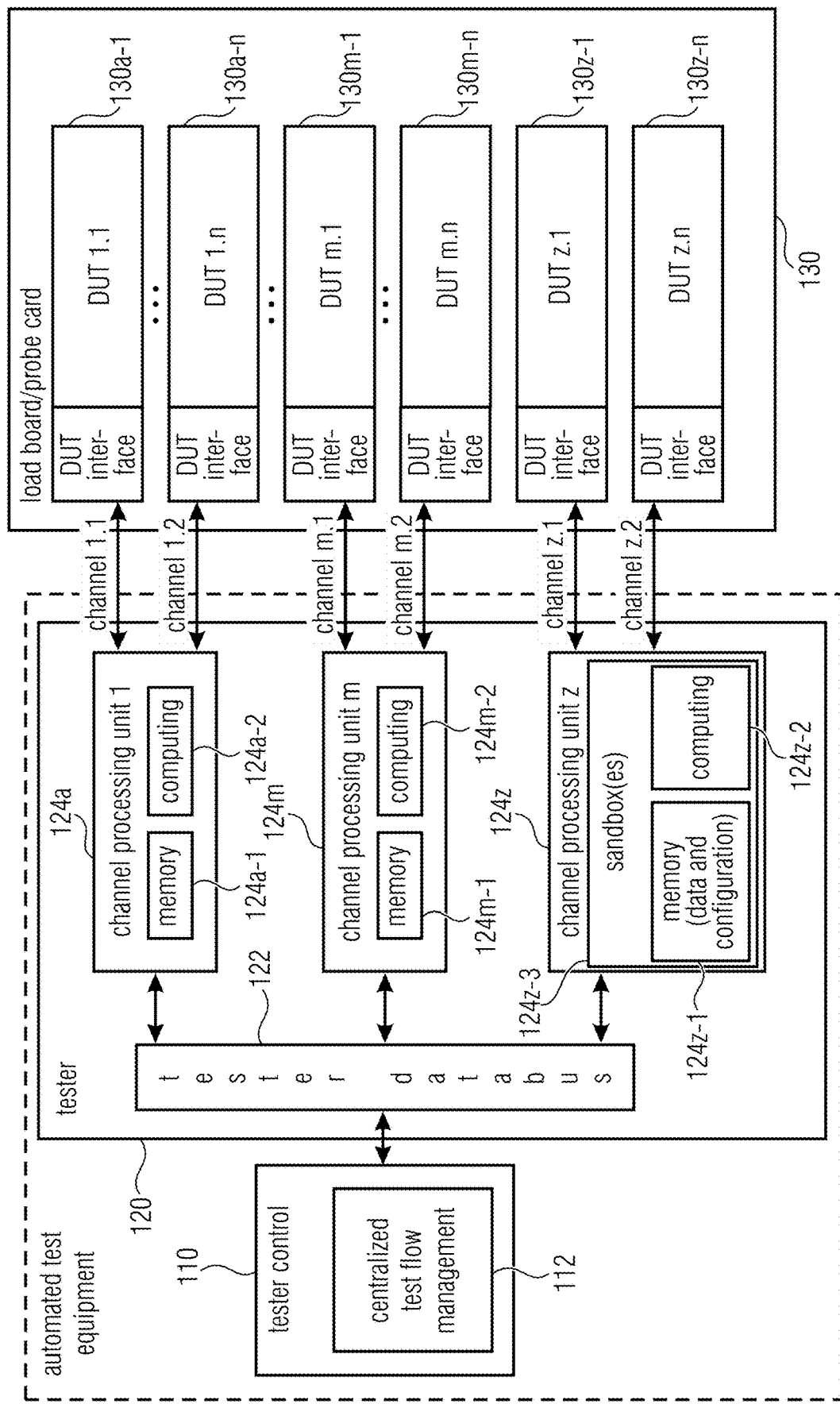
FIG. 1B shows a block schematic diagram of an automated test equipment for providing device-specific communication to a device-under-test, according to an embodiment of the invention.

Automated Test Equipment According to FIG. 1*a* and FIG. 1*b*

FIG. 1A shows a block schematic diagram of an automated test equipment 100, according to an embodiment of the present invention. The automated test equipment 100 comprises a tester control 110, which is configured to broadcast and/or specifically upload to a matching module (e.g., to a channel processing unit) input data 114*a* (e.g., a DUT stream, or an incoming tester command stream, or a broadcast data, or a shared data, or a data equal for different DUTs, or a common expected result data) and device specific data 114*b*.

The automated test equipment 100 further comprises a channel processing unit 124 configured to transform input data 114*a* using device specific data 114*b*, in order to obtain device-under-test adapted data 126 for testing the device-under-test 130. Alternatively or an addition, the automated test equipment 100 is configured to process DUT data 128 from a DUT 130 using device specific data 114*b*, in order to test or evaluate a DUT 130.

Accordingly, the channel processing unit may generate device-under-test adapted data in a decentralized manner, which may help to avoid a transmission of different device-under-test adapted data to different channel processing units which may all be coupled to the tester control. For example, a data volume of the input data 114*a*, which may be device-agnostic and which may not be adapted to an individual DUT, may be significantly larger than the device specific data, which may, for example, be different for each individual DUT. Consequently, it may only be necessary to individually send the small amount of device-specific data to different channel processing units in an automated test equipment comprising multiple channel processing units. Also, the tester control, which may, for example, handle a simultaneous testing of multiple devices under test using different channel processing units, does no longer need to perform the DUT-specific (DUT-individual) adaptation of the "input data", because this functionality is taken over by the one or more channel processing units coupled to the tester control.

Moreover, it should be noted that the automated test equipment of FIG. 1A may optionally be supplemented by any of the features, functionalities and details disclosed herein, both individually and taken in combination.

FIG. 1B shows a block schematic diagram of an automated test equipment 100 according to an embodiment of the present invention. The automated test equipment 100 comprises a tester control 110. The tester control 110 comprises a centralized test flow management 112 which is configured to broadcast and/or specifically upload to one or more matching modules (e.g., to the matching channel processing units 124*a* to 124*z*) input data 114*a*. Furthermore, the centralized test flow management is configured to broadcast and/or specifically upload to one or more matching modules (e.g., to the matching channel processing units 124*a* to 124*z*) device-specific data 114*b* (e.g., keys, and/or credentials, and/or IDs, and/or configuration).

The automated test equipment 100 further comprises a tester 120. The tester comprises a tester data bus 122 which is coupled to the centralized test flow management 112 (which is part of the tester control 110) and to a plurality of channel processing units 124*a* to 124*z*. The tester data bus 122 is configured to receive (or obtain) the input data 114*a* with device specific data 114*b* from the centralized test flow management 112 (which is part of the tester control 110) and to transfer the input data 114*a* to one or more of the channel processing units 124*a* to 124*z*. The channel processing unit 124*a* comprises a memory unit 124*a*-1 and a computing unit 124*a*-2. The device specific data 114*b* is stored in the memory unit 124*a*-1. The input data 114*a* is processed with device specific data 114*b* in computing unit 124*a*-2 in order to obtain device-under-test adapted data 126 for testing the device-under-test 130*a*-1.

The channel processing unit 124*a* is configured to transmit the device-under-test adapted data to a respective DUT 130*a*-1 which is mounted on a load board or probe card 130. The device-under-test adapted data is transmitted to a respective DUT 130*a*-1 by means of a device specific channel 1.1 and a respective DUT interface. The DUT interface may, for example, be coupled to a PCIe physical interface or the USB physical interface, but may also comprise a JTAG interface, an iJTAG interface or any other appropriate interface.

The device-under-test adapted data may represent a program code of a test program (e.g., for testing a system-on-chip) and/or data to be processed and may be used (e.g., executed or processed) on the DUT 130*a*-1. After the test execution, the DUT data 128 is transmitted to the channel processing unit 124*a* by means of the respective DUT interface and the device specific channel 1.1. The channel processing unit 124*a* is configured to process the respective DUT data using device specific data, e.g., in order to extract the upstream result data (e.g., respective result data, or DUT data from the device-under-test). Accordingly, the channel processing unit 124*a* is configured to store upstream result data in the memory unit and/or to analyze upstream result data using expected result data, or compare with the expected result data. In other words, the analysis on the upstream result data is to specify if there is a difference between the upstream result data and the expected result data in which the difference may reflect the production defects on the respective DUT. Moreover, the upstream result data may be pre-processed, and/or compressed, and/or transmitted (forwarded) to the tester control 110 via the tester data bus (interface) 122 by the channel processing unit 124*a*.

In multi-site DUT testing, driving a test efficiency is a key enabler. By reducing bus traffic and CPU requirements with an efficient test methodology may help to reduce overall costs and test time. In case of no software or hardware related defects or faults on DUT platforms, then the tests applied to multiple DUTs may have the tendency to have the same or similar results. Considering this aspect, in the channel processing unit of the present invention, a compare operation may be applied in the computing unit. Accordingly, in the computing unit, the common expected result data from the tester control is compared with the respective test result data from the DUT. After the comparison operation, solely the difference between the common expected test result data and the respective test result data may be compressed and transmitted to the tester control 110. This may reduce the bus traffic and the CPU requirements on the tester control.

Another (optional) feature contributing to the DUT test efficiency is the optional sandboxing which provides a better memory (124*a*-1 to 124*z*-1) and a computing (124*a*-2 to 124*z*-2) resource utilization. The channel processing units 124*a* to 124*z* may optionally comprise one or more sandboxes (e.g., as shown at reference numeral 124*z*-3) wherein the one or more sandboxes 124*z*-3 are configured to execute commands with the virtual individual memory 124*z*-1 and the computing 124*z*-2 capability with or without resource-sharing depending on the architecture. The one or more sandboxes 124*z*-3 are configured to transform the input data 114*a* using the device-specific data 114*b*, and/or the one or more sandboxes 124*z*-3 are configured to analyze results received from the DUT 130 with individual computing capability. Moreover, the automated test equipment 100 is configured to upload a software to one or more sandboxes 124*z*-3, to allow for a device-specific processing of the input data 114*a* or of the DUT data 128 using the sandbox 124*z*-3. Accordingly, the sandboxing feature enables virtual, individual memory and computing capability to test the DUT 130*a*-1 in an isolated environment.

Figure 2A:
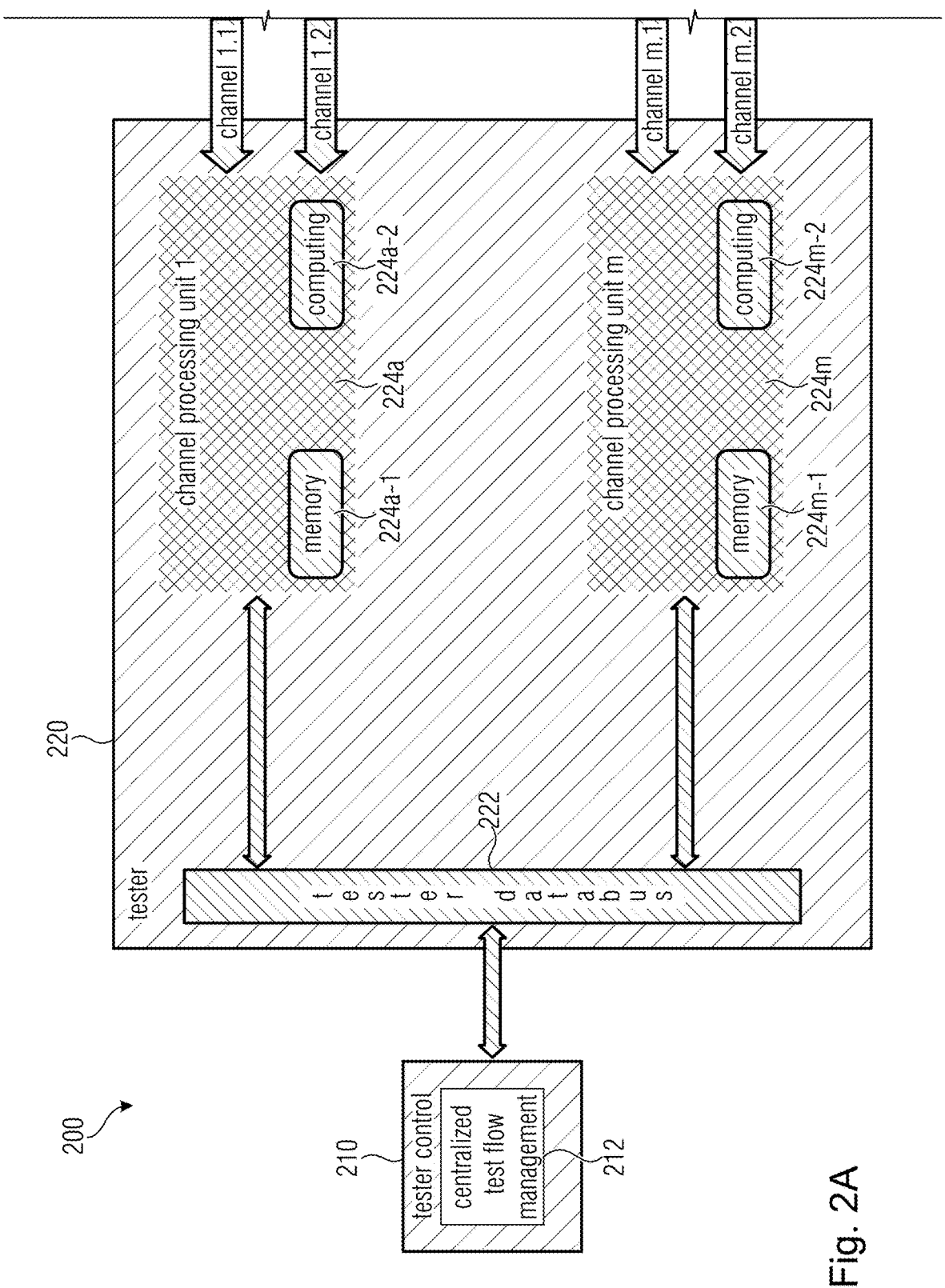
FIG. 2A shows a block schematic diagram of an automated test equipment for providing device-specific communication to a device-under-test, according to an embodiment of the invention.
Figure 2B:
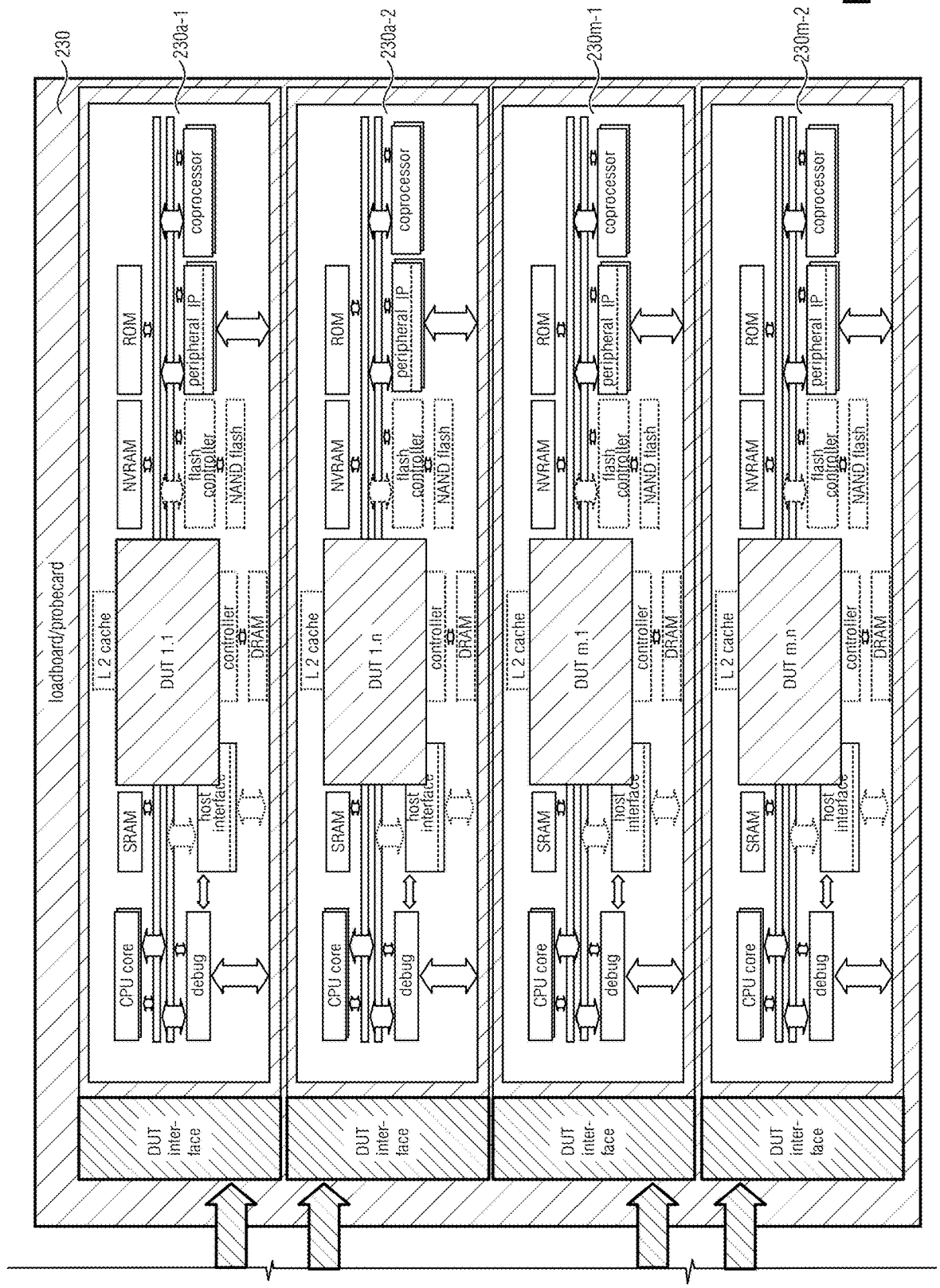
FIG. 2B shows a second block schematic diagram of the automated test equipment of FIG. 2A for providing device-specific communication to a device-under-test. according to an embodiment of the invention.

As an additional remark, it should be noted that, optionally, two or more devices under test (e.g., DUTs 130*a*-1 and 130*a*-2) may be coupled to a single channel processing unit (e.g., to channel processing unit 124a), e.g., using separate channels (e.g., channel 1.1 and channel 1.2, as shown in FIGS. 2A and 2B). However, in some embodiments, a single DUT may be coupled to a channel processing unit. Also, there may by cases in which a plurality of channel processing unit are used to test a single DUT, e.g., if the DUT comprises a very high number of pins and/or is composed of multiple, potentially independent, interfaces.

However, it should also be noted that the tester 120 does not necessarily need to have the component 124z. Rather, optionally, one or more of said components can be omitted or altered. Moreover, it should be noted that the automated test equipment 100 can optionally be supplemented by any of the features, functionalities and details disclosed herein, both individually and taken in combination.

Example According to FIGS. 2A and 2B

FIGS. 2A and 2B show a block schematic diagram of an automated test equipment 200 for providing a device-specific communication to a device-under-test 230a-1, according to an embodiment of the invention. The automated test equipment 200 comprises a tester control 210. The tester control 210 comprises a centralized test flow management 212 which is configured to broadcast and/or specifically upload to one or more matching modules the input data (e.g. data 114a) and the device-specific data (e.g. data 114b).

The automated test equipment 100 further comprises a tester 220. The tester comprises a tester data bus 222 which is coupled to the centralized test flow management 212 and to a plurality of channel processing units 224a to 224m. The tester data bus 222 is configured to receive the input data with device specific data from the centralized test flow management 212 and transfer the input data to the plurality of the channel processing units 224a to 224m. The channel processing unit 224a comprises a memory unit 224a-1 and a computing unit 224a-2. The device specific data for each respective DUT is stored in the memory unit 224a-1 of a respective channel processing unit. The input data is processed with respective device specific data in the computing unit 224a-2 in order to obtain device-under-test adapted data 126 for testing the respective device-under-test 230a-1.

The use of per-channel processing units transforms the input data with the (local) device specific data (e.g., local device specific information and/or keys and/or credentials and/or IDs and/or a configuration). The encrypted/decrypted device specific communication is used in order to prevent the interfaces (e.g., channel 1.1. and channel 1.2) from unauthorized access to internal device structures.

Moreover, it should be noted that the automated test equipment 200 may optionally be supplemented by any of the features, functionalities and details disclosed herein, both individually and taken in combination.

Figure 3A:
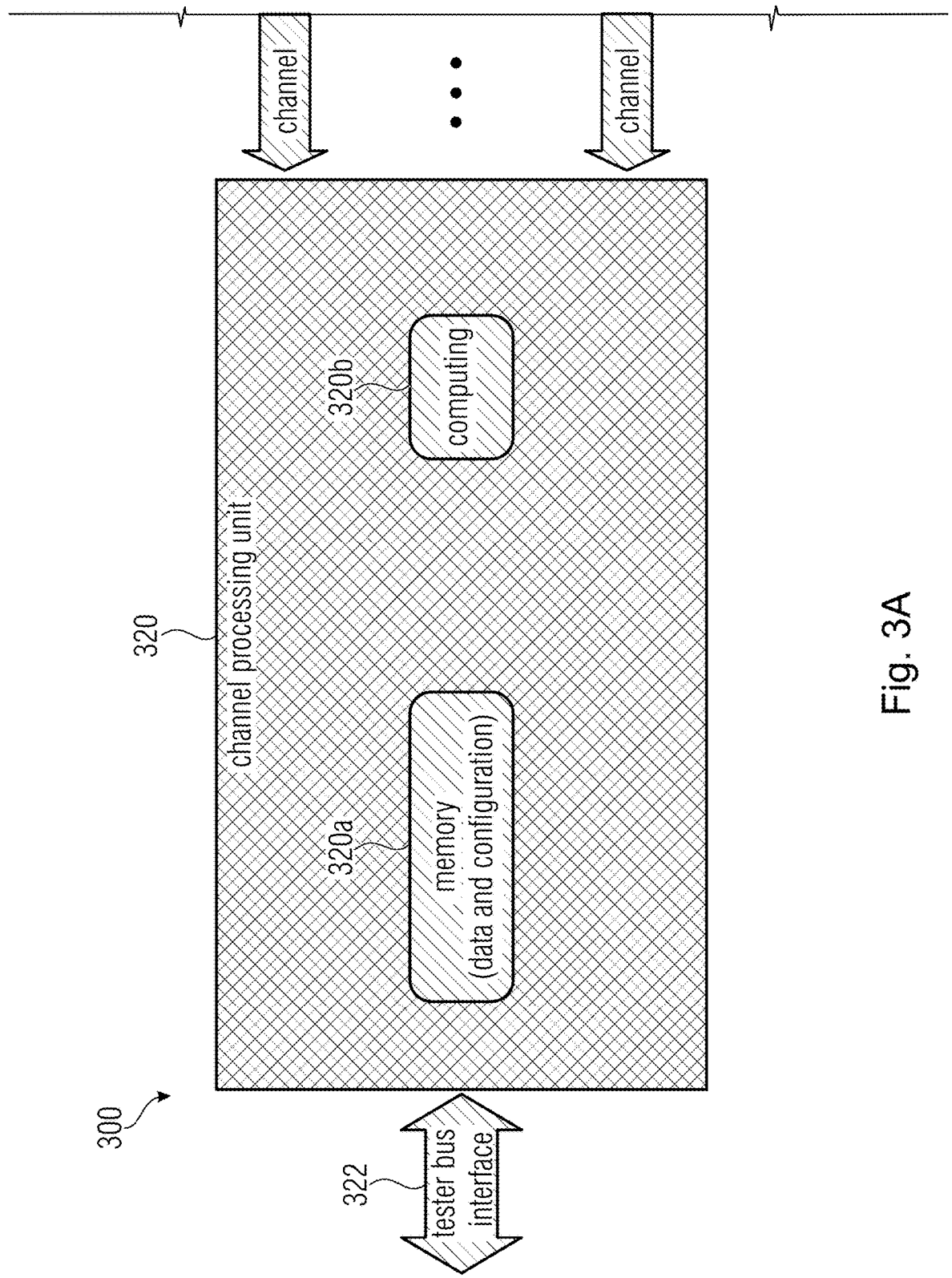
FIG. 3A shows a block schematic diagram of a channel processing unit according to an embodiment of the invention.
Figure 3B:
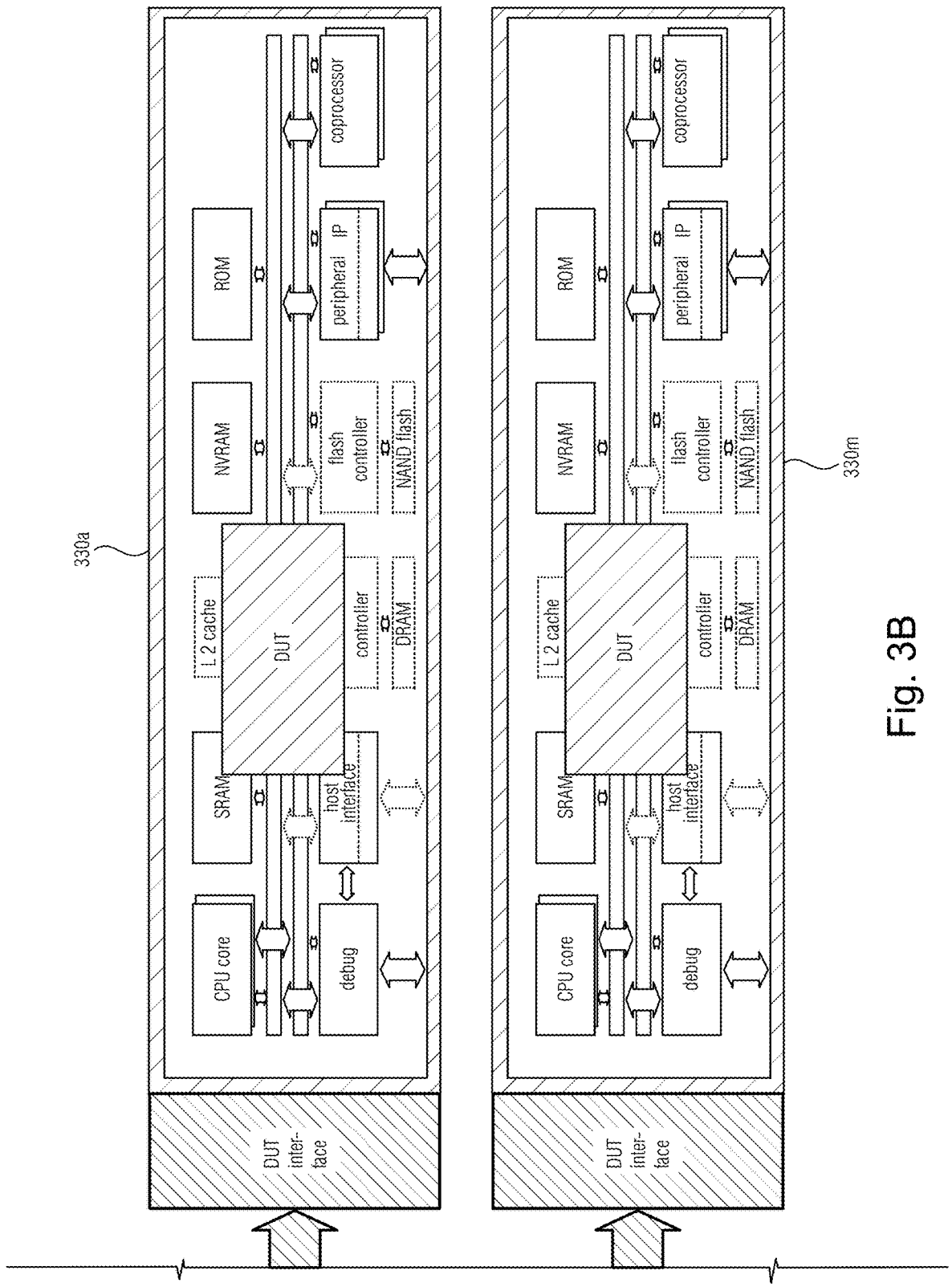
FIG. 3B shows a second block schematic diagram of the channel processing unit of FIG. 3A according to an embodiment of the invention.

Example According to FIGS. 3A and 3B

FIGS. 3A and 3B show a block schematic diagram of a channel processing unit 320 according to an embodiment of the invention. The channel processing unit 320 may, for example, take the place of the channel processing units 124a to 124z or of the channel processing units 224a to 224m. The channel processing unit 320 comprises a memory 320a and a computing unit 320b. The memory 320a unit is configured to store data (e.g. the device-specific data which may, for example, comprise keys and/or credentials and or IDs), and the configuration. The channel processing unit 320 is configured to transform input data (e.g., a DUT stream or incoming tester command stream or broadcast data or shared data or data equal for different DUTs or common expected result data) into device-specific data or device-specific communication, for example by using secured device communication or secured device communication coding and protocol-aware (or protocol-aware coding) with local device-specific information. The secured device communication is achieved with encryption or decryption of DUT communication or authorization which refers to granting certain level of access, or authentication which refers to confirming the identity of users.

Moreover, in terms of secure device communication, the communication between the DUT and the channel processing unit may (alternatively or in addition) further be protected by using packet counters and/or error correction codes and/or error identification codes.

The protocol-aware data (e.g., device-under-test adapted data, or data adapted to an individual device-under-test, or expected result data adapted to a device-under-test) is, for example, obtained by transforming the input data sent from tester control with local device specific information.

Thus, the channel processing unit 320 may help to reduce the load of the tester control and of the tester data bus, while ensuring a high security level.

Moreover, it should be noted that the channel processing unit 300 may optionally be supplemented by any of the features, functionalities and details disclosed herein, both individually and taken in combination.

Figure 4A:
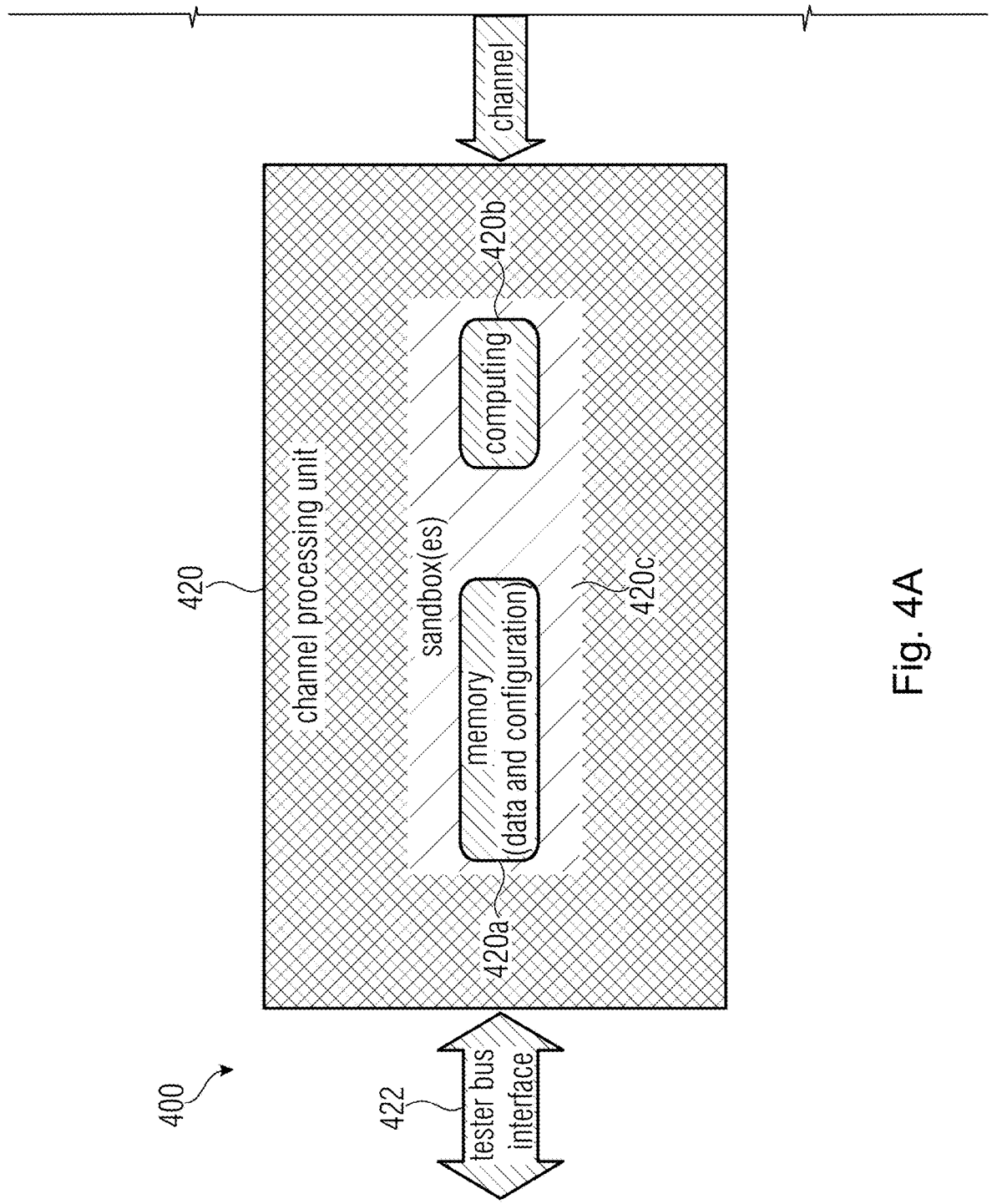
FIG. 4A shows a block schematic diagram of a sandbox in channel processing unit according to an embodiment of the invention.
Figure 4B:
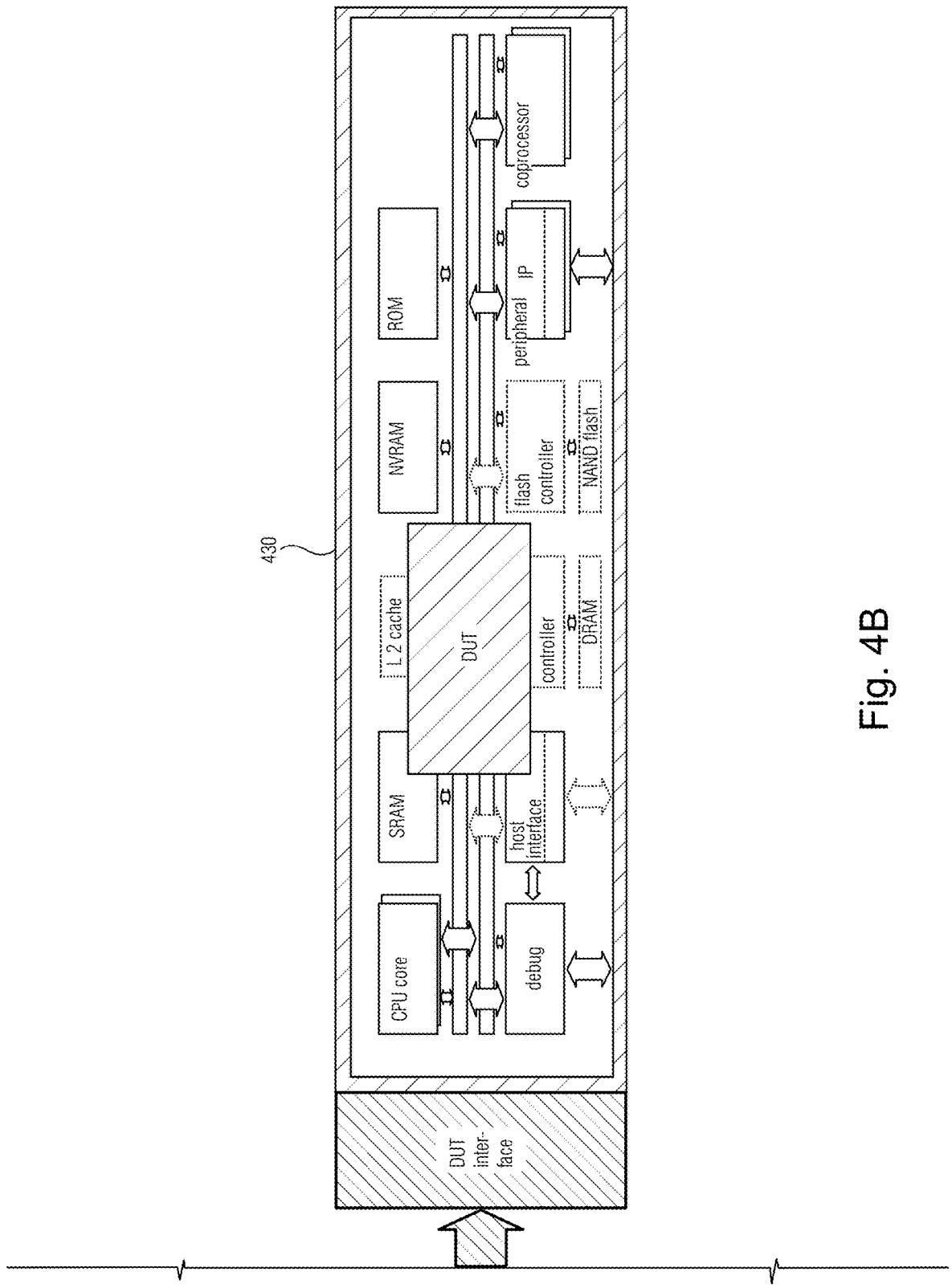
FIG. 4B shows a second block schematic diagram of the sandbox in channel processing unit of FIG. 4A according to an embodiment of the invention.

Example According to FIGS. 4A and 4B

FIGS. 4A and 4B show a block schematic diagram of a sandbox in a channel processing unit according to an embodiment of the invention. The channel processing unit 420 (which may, for example, take the place of any channel processing units disclosed herein) may optionally comprises at least one sandbox 420c wherein the at least one sandbox 420c comprises (or has associated) the memory 420a and the computing 420b units.

The at least one sandbox 420c is configured to transform the input data using the device-specific data, and/or the at least one sandbox 420c is configured to analyze results received from the DUT 430 with individual computing capability. Moreover, the automated test equipment 400 is configured to upload a software to the at least one sandbox 420c, to allow for a device-specific processing of the input data or of the DUT data using the sandbox 420c. Moreover, the sandbox may comprise secure and well-defined interfaces to the rest of the channel processing unit, to allow for a provision of data from the sandbox to the DUT and/or vice versa. Accordingly, the sandboxing feature enables virtual, individual memory and computing capability to test the DUT 430 in an isolated environment.

Moreover, it should be noted that the channel processing unit 400 may optionally be supplemented by any of the features, functionalities and details disclosed herein, both individually and taken in combination.

Figure 5A:
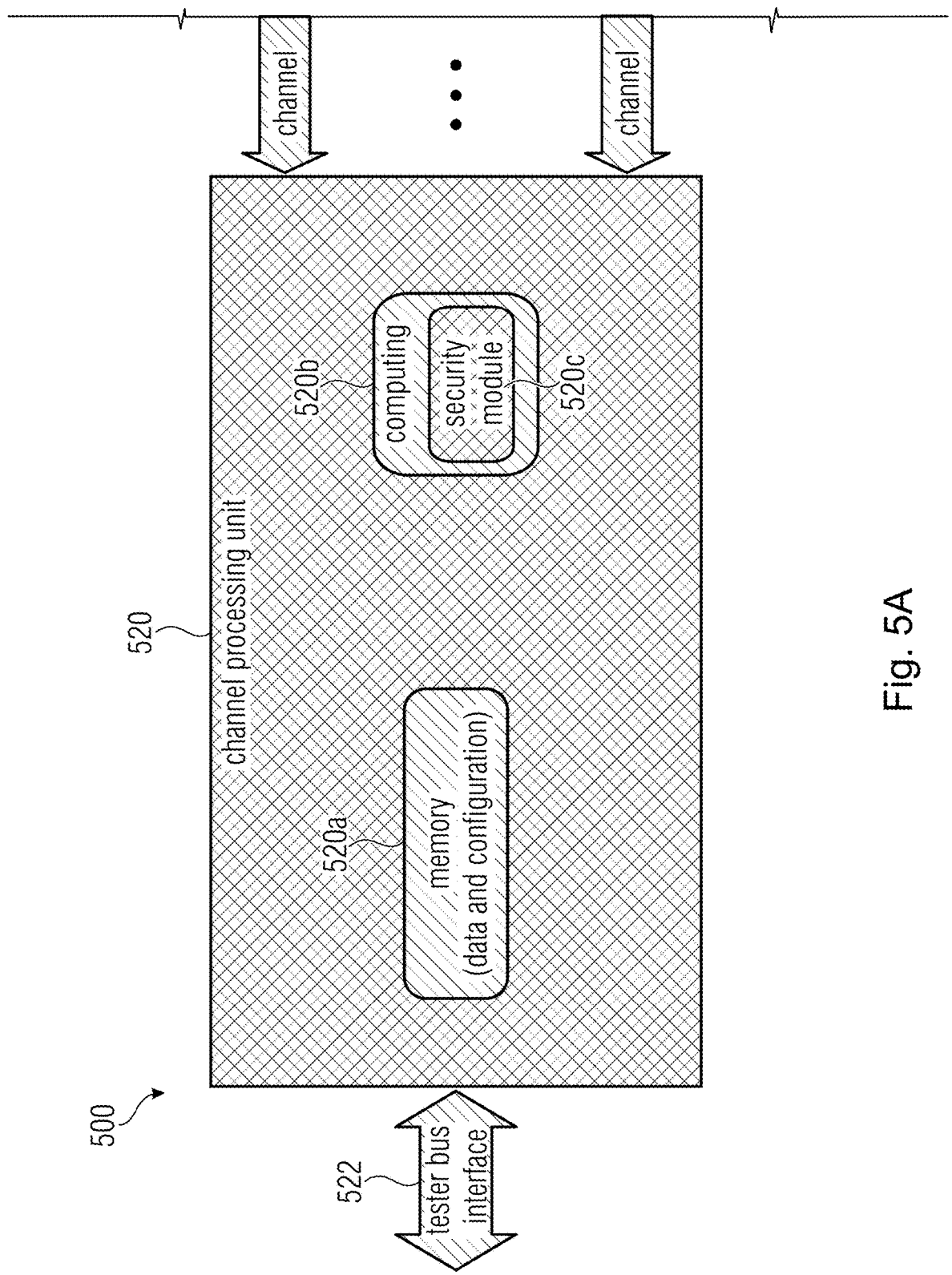
FIG. 5A shows a block schematic diagram of a channel processing unit comprising a security module according to an embodiment of the invention.
Figure 5B:
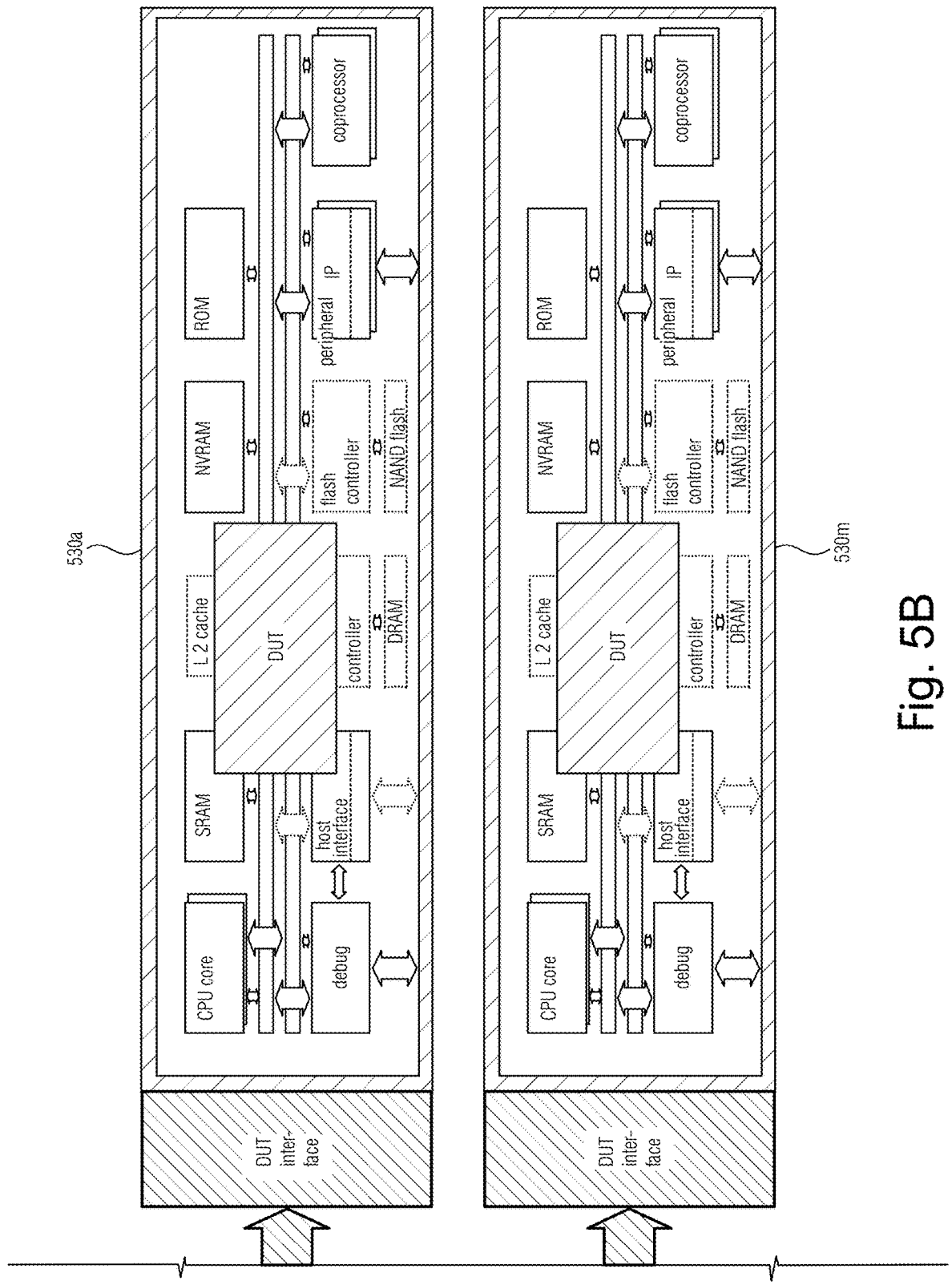
FIG. 5B shows a second block schematic diagram of the channel processing unit comprising a security module of FIG. 5A according to an embodiment of the invention.

Example According to FIGS. 5A and 5B

FIGS. 5A and 5B show a block schematic diagram of a channel processing unit comprising a security module according to an embodiment of the invention. The channel processing unit 520 (which may, for example, take the place of any of the channel processing units disclosed herein) comprises a memory 520a and a computing unit 520b. The computing unit 520b further comprises a security module

520c. The device-specific data (e.g., keys, credentials, IDs, and configuration) is stored in the local memory 520a before the DUT communication. The computing unit 520b, which comprises the security module 520c, is configured to interact with the DUT interface.

The security module is configured to protect the DUT communication by managing and performing encryption/decryption, or authorization, or authentication functions. Moreover, the communication between the DUT and the channel processing unit may, for example be further protected by using packet counters and/or error correction codes and/or error identification codes in order to detect communication channel (e.g., transmission medium) related errors after the DUT data is received by the channel processing unit. The error identification and error correction codes add some redundancy to the input data, enabling to check consistency of the transmitted data (e.g., device-under-test adapted data) and to recover the received data when corrupted due to the channel transmission. The error identification (detection) codes may, for example, be (or comprise) a cyclic redundancy check. The error correction code may typically be (or comprise) one or more forward error correction codes (e.g., Viterbi decoding, block codes) and/or automatic repeat request.

Moreover, it should be noted that the channel processing unit 500 may optionally be supplemented by any of the features, functionalities and details disclosed herein, both individually and taken in combination.

Figure 6A:
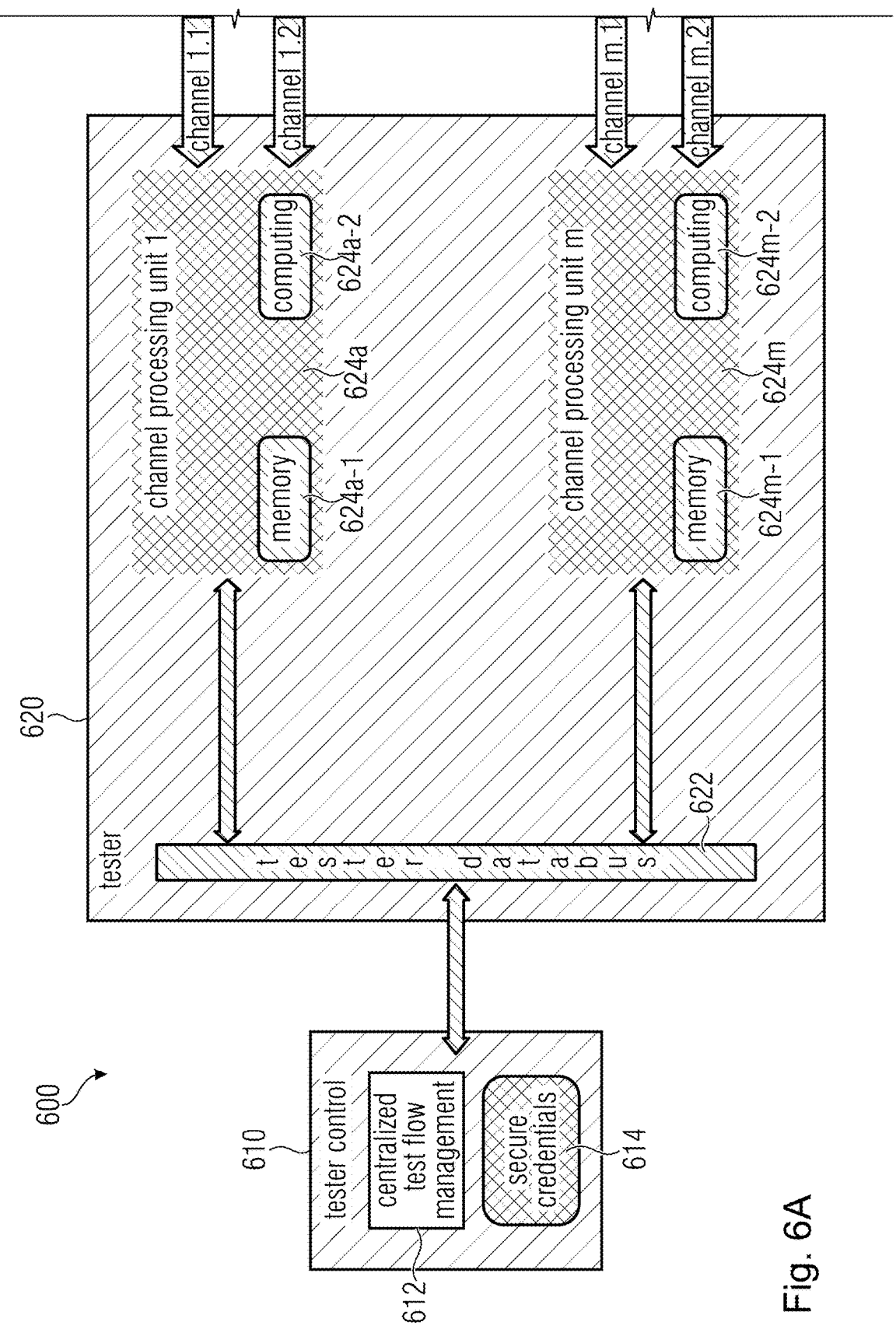
FIG. 6A shows a block schematic diagram of an automated test equipment for credential management according to an embodiment of the invention.
Figure 6B:
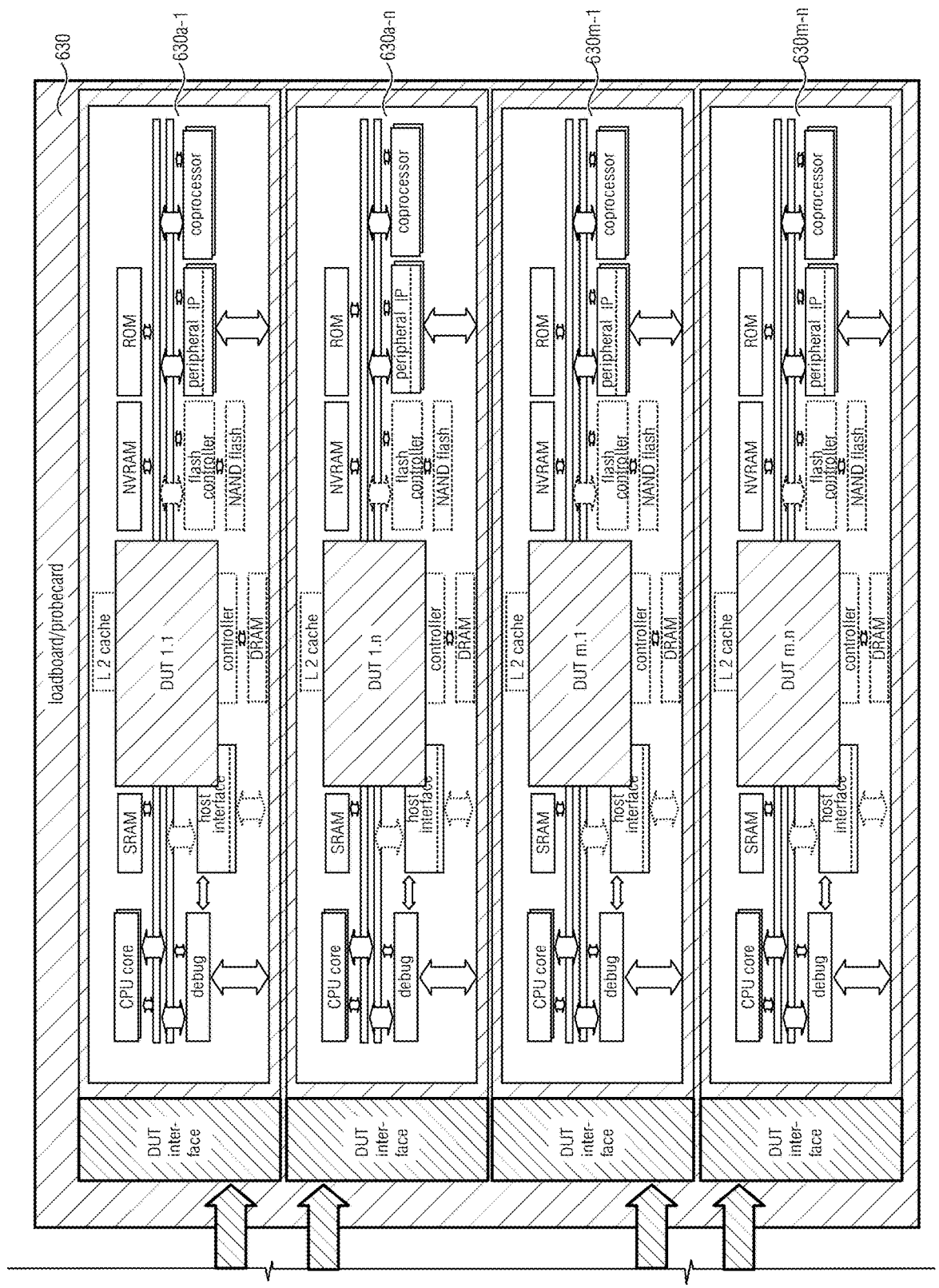
FIG. 6B shows a second block schematic diagram of the automated test equipment for credential management of FIG. 6A according to an embodiment of the invention.

Example According to FIGS. 6A and 6B

FIGS. 6A and 6B show a block schematic diagram of an automated test equipment 600 for credential management according to an embodiment of the invention. The tester control 610 comprises a centralized test flow management 612 and the centralized test flow management 612 further comprises a secure credentials 614 unit. The tester control is configured to obtain (e.g. receive or generate) security credentials and/or keys (e.g., automated test equipment 600 specific security credentials or keys, like a public key of the automated test equipment 600) and broadcast and/or specifically upload (e.g., the security credentials or keys) to one or more matching modules (e.g., to the respective channel processing units 524a to 624m, which may, for example, correspond to any of the channel processing units disclosed herein) and/or to one or more respective DUTs. Furthermore, the encryption may be applied by (or using) the tester-specific credentials known to the CPU.

Moreover, it should be noted that the automated test equipment 600 may optionally be supplemented by any of the features, functionalities and details disclosed herein, both individually and taken in combination.

Figure 7A:
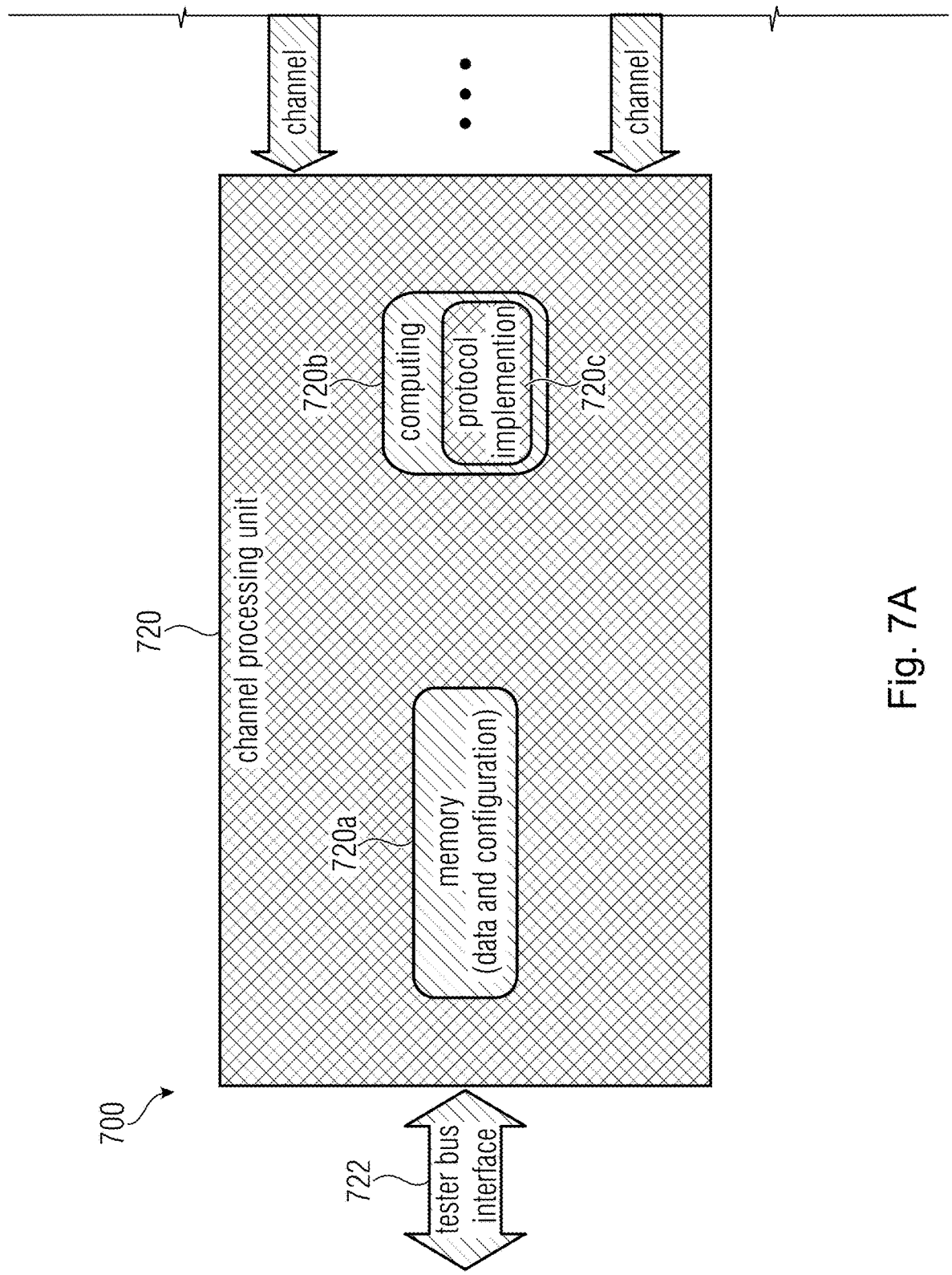
FIG. 7A shows a block schematic diagram of a channel processing unit comprising a protocol implementation unit according to an embodiment of the invention.
Figure 7B:
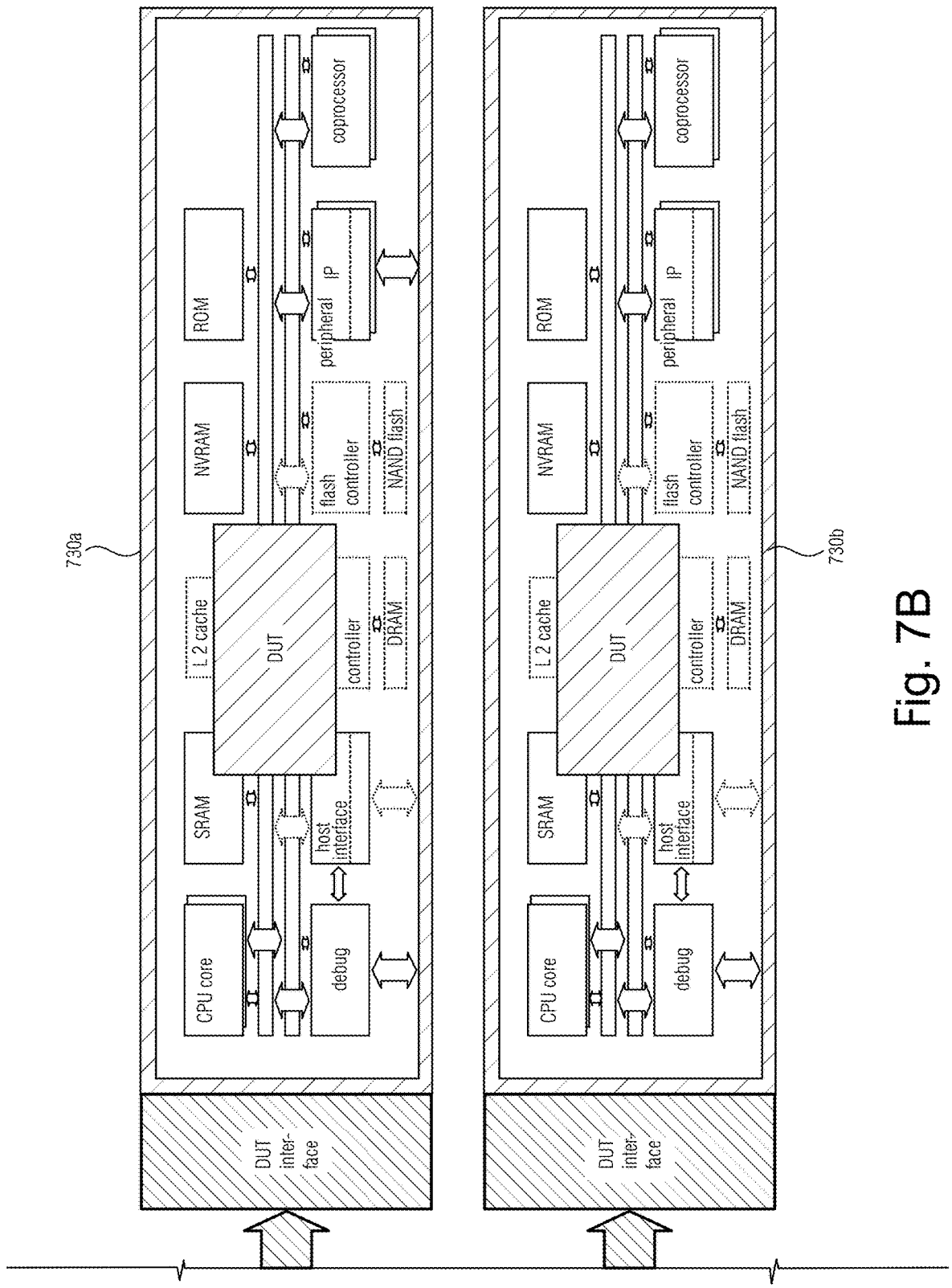
FIG. 7B shows a second block schematic diagram of the channel processing unit comprising a protocol implementation unit of FIG. 7A according to an embodiment of the invention.

Example According to FIGS. 7A and 7B

FIGS. 7A and 7B shows a block schematic diagram of a channel processing unit comprising a protocol implementation unit according to an embodiment of the invention. The channel processing unit 720 (which may take the place of any of the channel processing units disclosed herein) comprises a memory 720a and a computing unit 720b. The computing unit 720b further comprises a protocol implementation unit 720c. The protocol communicating with the respective DUT is programmable in hardware or software and is therefore reconfigurable. The computing unit 720b is configured to interact with one or more DUT interfaces.

The communication protocol implementation in the channel processing unit 720 is, for example, configured to use (consider) one or more packet counters, and/or handshake with device-specific contents (e.g. device ID), and/or synchronous communication including timestamp, and/or implementation of communication standards such as IEEE 1687.x, or IEEE 1500, or IEEE 1149.x.

By using a protocol implementation in the computing unit 720b, the amount of data upload to the channel processing unit from the tester control can be kept small, because the protocol overhead can be generated by the channel processing unit. Also, device-specific protocol aspects are introduced at the side of the channel processing unit, which again significantly reduces the load of the tester bus.

Moreover, it should be noted that the channel processing unit 700 may optionally be supplemented by any of the features, functionalities and details disclosed herein, both individually and taken in combination.

Applications

In the following, some applications will be described taking reference to FIGS. 8 to 9. FIGS. 8A, 8B, 9A, and 9B. FIGS. 8A and 8B show a block schematic diagram of a first scenario, in which results of a local preprocessing of the upstream results are stored and compared with the expected results.

The channel processing unit 820 (which may take the place of any of the channel processing unit disclosed herein) comprises a memory 820a and a computing unit 820b. The memory unit 820a comprises an expected results unit or memory portion 820a-1 which may store the common expected result data provided by the tester control (which may be common of multiple devices under test). Moreover, the computing unit 820b comprises a comparator unit 820b-1 which may compare the received DUT data (or preprocessed DUT data, preprocessed in a device-specific or device-individual manner, e.g., using the device-specific data) and the expected result data (e.g., expected result data processed in a device-specific manner using the device-specific data by the channel processing unit) which may be stored in the memory unit 820a.

The channel processing unit 820 is, for example, configured to process (or preprocess) the respective DUT data using device-specific data in order to extract the upstream result data (e.g., respective result data, or DUT data from the device-under-test). Accordingly, the channel processing unit 820 is, for example, configured to store upstream result data in the memory unit 820a. Furthermore, the channel processing unit 820 is, for example, configured to analyze the upstream result data using expected result data. This may be achieved in the comparator unit 820b-1 (which is part of the computing unit 820b) by comparing the upstream result data with the expected result data stored in expected results unit 820a-1 (which is part of the memory unit 820a).

Moreover, the upstream result data may, for example, be pre-processed, and/or compressed, and/or transmitted (forwarded) to the tester control via the tester data bus (interface) 822 by the channel processing unit. The upstream result data may, for example, be compressed in order to reduce the volume of data for a fast exchange of data and to reduce the transmission time.

The automated test equipment 800 is, for example, configured to control the test (e.g., an upload of a program, and/or an execution of one or more portions of a test program, and/or a download of a result data, and/or a debugging) of a device-under-test on the basis of an overall test execution program in test sequences. The channel processing unit 820 is, for example, configured to provide output to sequencing which controls the sequence execution (e.g., an adjustment of a timing of edges in a signal provided to a DUT) and transfers the digital data stream or sequence of signals with specific timing adjustment to the driver.

The driver is configured to obtain input from sequencing and communicate with the device-under-test through (e.g., interactive) interfaces (which may, for example, be an iJTAG interface or an RSN interface or an IEEE-1687 interface). The driver may, for example, be configured to add or adjust analog voltage levels or the driver may act like a multiplexer to switch the device-under-test between different voltage levels to check the voltage level of which the driver-under-test can tolerate.

The driver stimulates a sequence, which is then transferred via a data communication channel and communicated with device-under-test through the DUT interface. For example, the device-under-test functionality over various voltage and frequency levels may be checked through sequences stimulated by the driver. In some cases, the sequences received from the DUT and the sequences sent by the DUT have to be fully bit by bit identical. The DUT driver may, for example, send the data sequence to the automated test equipment 800 through the DfT interface that checks the received sequence for errors. It should be noted that, the channel processing unit is, for example, configured to compare the received sequence (DUT data) with the expected results in the comparator which is part of the computing unit.

Generally speaking, different approaches are possible. As an example, the channel processing unit may receive common expected result data from the tester control, transform the common expected result data into device-adapted expected result data, store the device-adapted expected result data, and perform a comparison between the device-adapted expected result data and DUT data received from the DUT, to evaluate the DUT. Alternatively, the channel processing unit may store the common expected result data (which are common for a plurality of DUTs), extract result data from the DUT data using the device specific data (thereby considering device-individual protocol features) and to compare the extracted result data with the common result data, to thereby evaluate the DUT. However, different processing operations are also possible.

Figure 9A:
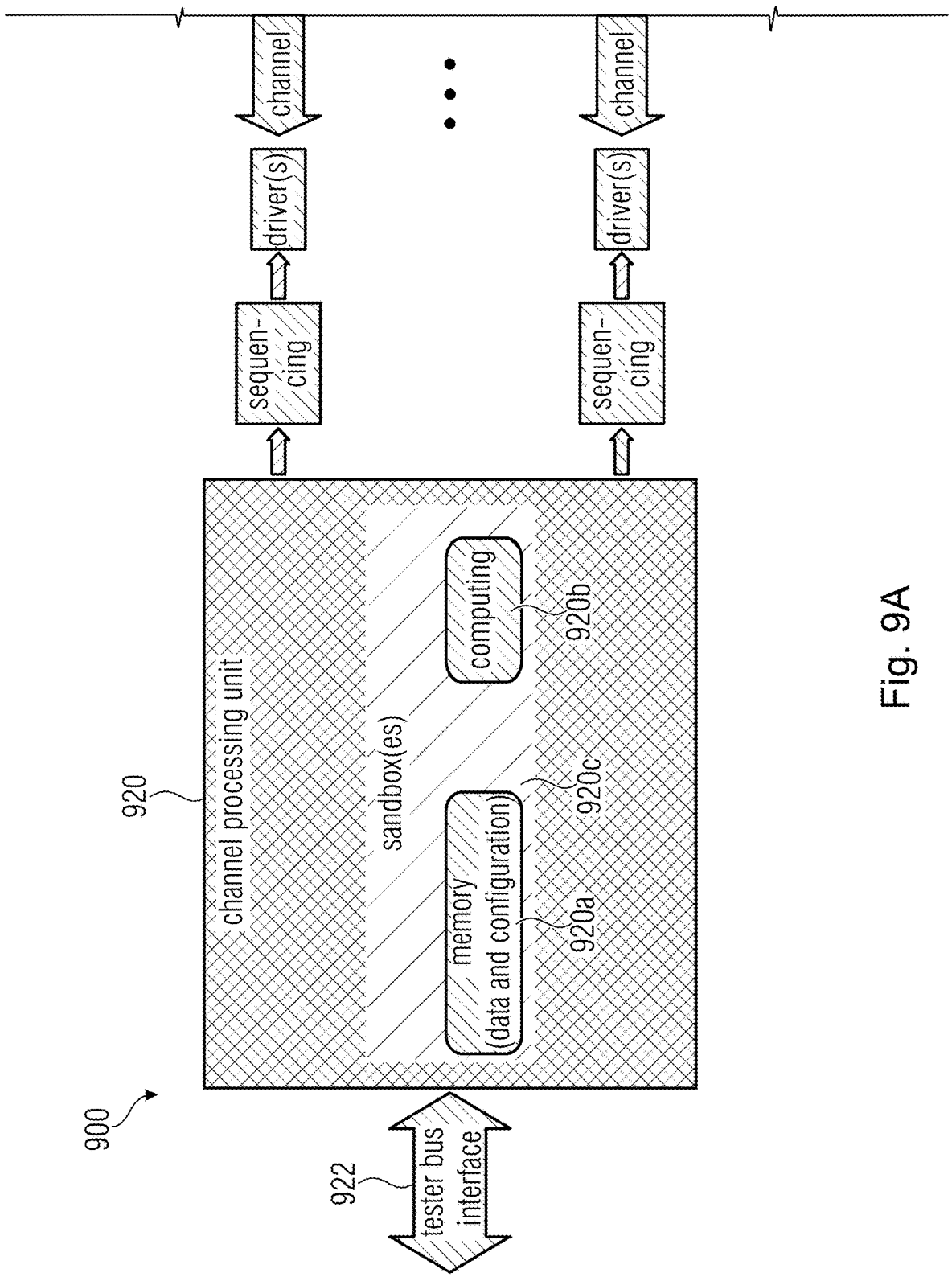
FIG. 9A shows a block schematic diagram of a sandbox in channel processing unit according to an embodiment of the invention.
Figure 9B:
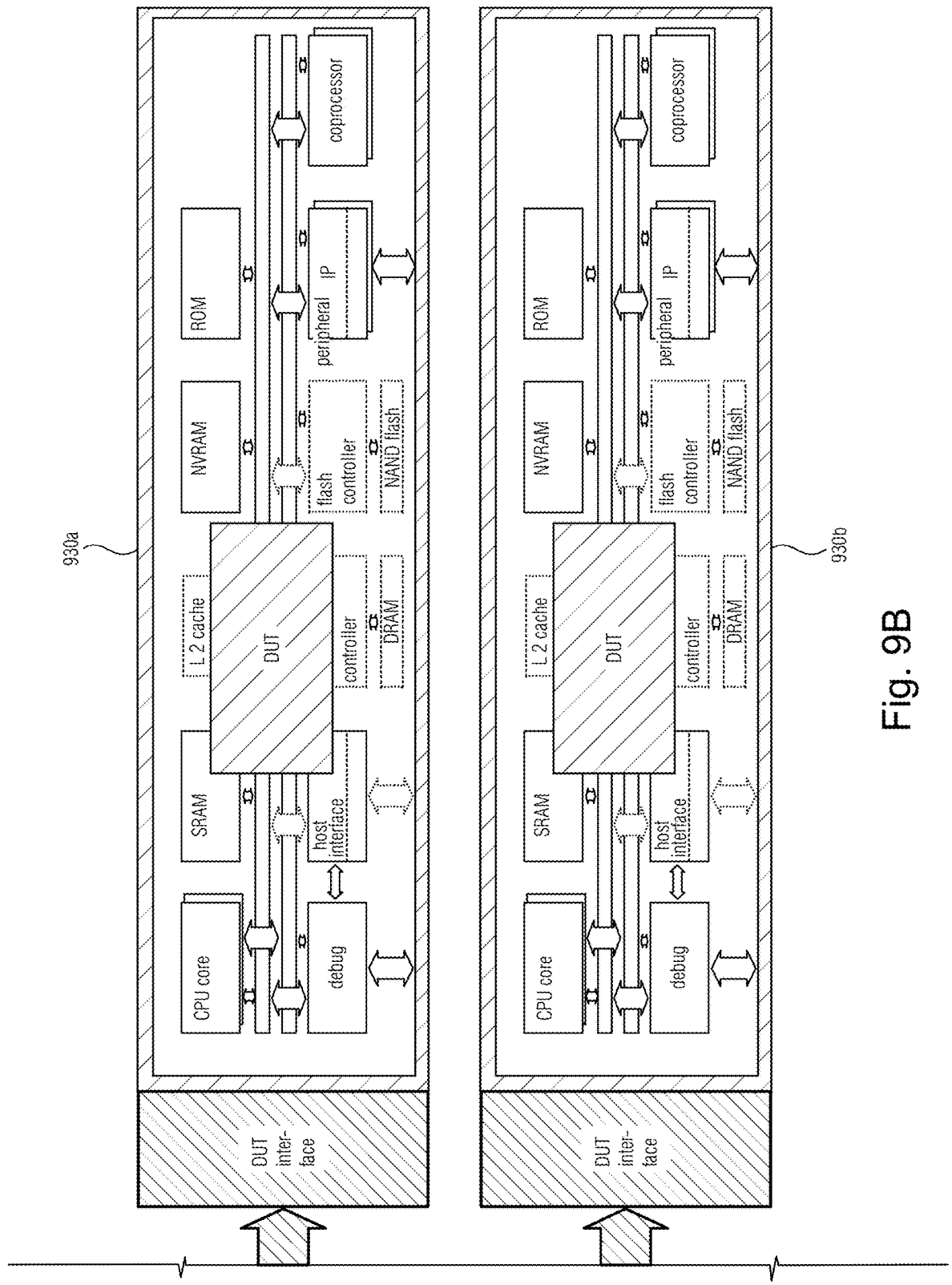
FIG. 9B shows a block schematic diagram of the sandbox in channel processing unit of FIG. 9A according to an embodiment of the invention.

FIGS. 9A and 9B show a block schematic diagram of a second scenario, in which a sandboxed channel processing unit 920 according to an embodiment of the invention is represented. The channel processing unit 920 comprises at least one sandbox 920c wherein the sandbox 920c comprises a memory unit 920a and a computing unit 920b. The memory unit 920a is configured to store the device-specific data and the configuration.

The automated test equipment 900 is configured to upload a software to at least one sandbox 920c, to allow for a device-specific processing of the input data or of the DUT data using the sandbox 920c. Likewise, a device-specific functionality can be updated by uploading from a third-party software in order to enable efficient device-specific computation steps (e.g., communication with the specific DUT interfaces knowing the device configuration).

The sandboxed channel processing unit 920 is configured to provide output to sequencing which controls the sequence execution and transfers sequence of signals with specific timing adjustment to the driver. The driver is configured to obtain the digital sequence of signals and add or adjust analog voltage levels and may transfer the signal to the device-under-test 930a through the DUT interface. For example, the device-under-test functionality over various voltage and frequency levels is checked through sequences stimulated by the driver. The DUT driver may, for example, send the sequences through the DfT interface to the debug interface. The debug interface may, for example, download the sequences of the DUT data and transfer it to the automated test equipment 900 in order to check the received sequence for errors.

However, it should be noted that the automated test equipment 800,900 may optionally be supplemented by any features, functionalities and details disclosed herein, both individually and taken in combination.

Figure 10A:
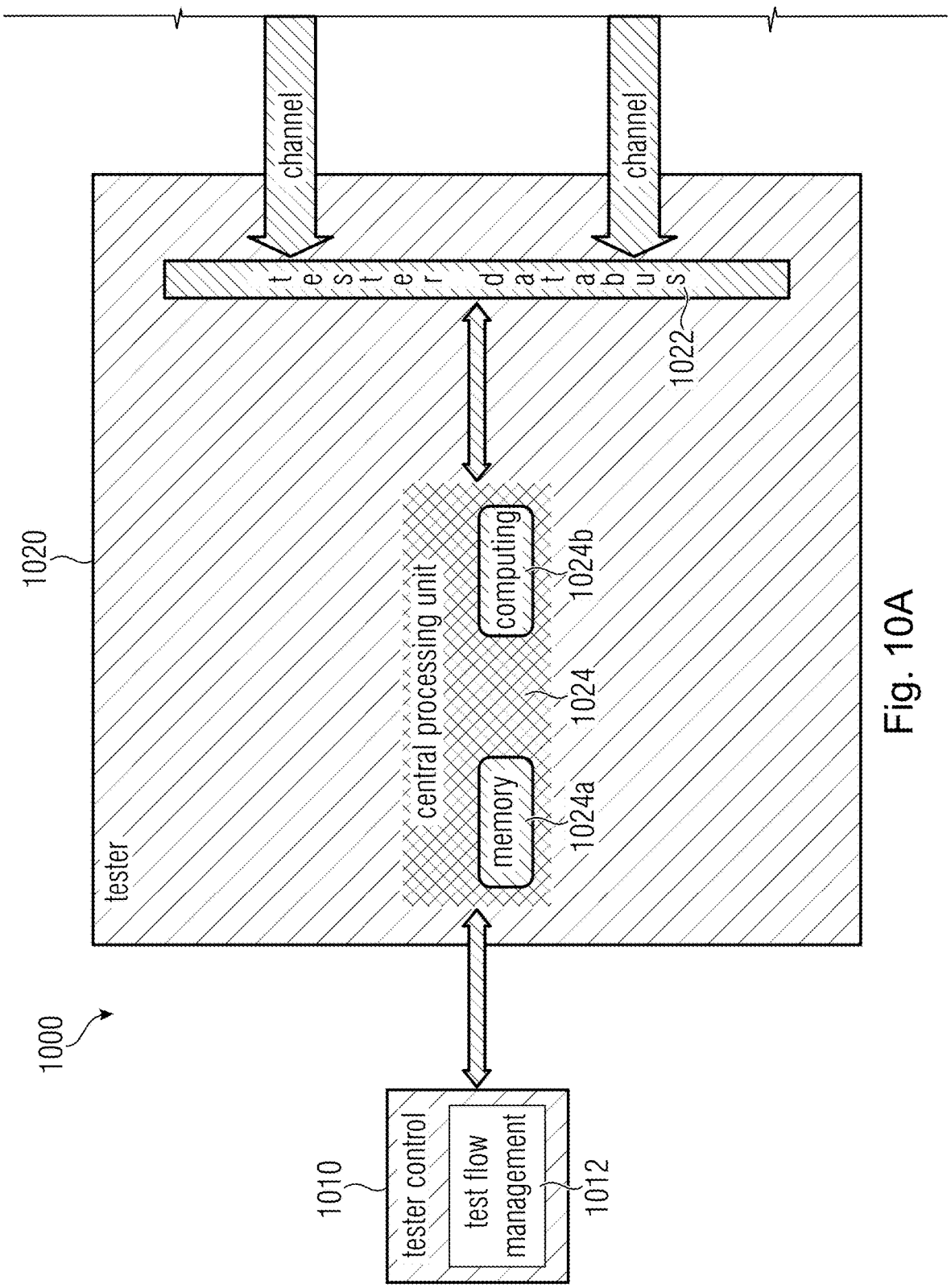
FIG. 10A shows a block schematic diagram of a conventional automated test equipment.
Figure 10B:
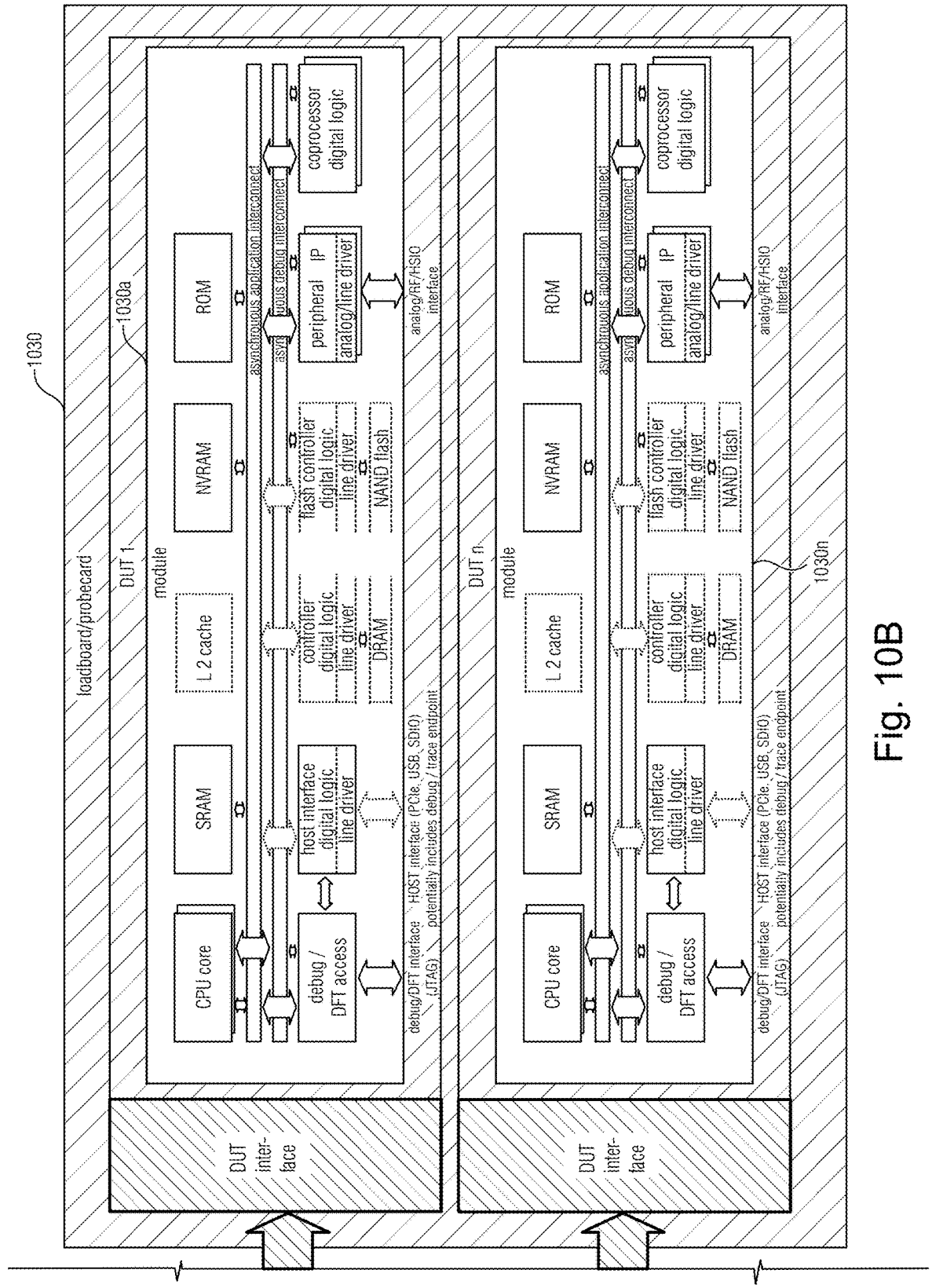
FIG. 10B shows a second block schematic diagram of the conventional automated test equipment of FIG. 10A.

Conventional Solution According to FIGS. 10A and 10B

FIGS. 10A and 10B show a block schematic diagram of a conventional automated test equipment 1000. However, it should be noted that the conventional automated test equipment 1000 is similar to the automated test equipment 100, or 200, or 600, except for the fact that there are no DUT-specific (or device specific) channel processing units and no security aspects such as encryption/decryption, utilization of an error detection mechanism, utilization of an error correction mechanism, or utilization of an authentication mechanism. Rather, prior art solutions rely on centralized channel architectures which cannot perform local data transformations. Furthermore, using a centralized channel architecture, data needs to be transported to a central processing unit and computed on a central processing unit. In this case, a high communication overhead or bottleneck for device-specific communication occurs due to central processing operation.

CONCLUSIONS

In the following, some conclusions will be provided. Also, aspects of the invention will be disclosed, which may be used individually or in combination, and which may optionally be introduced into any of the other embodiments, both individually and in combination.

Embodiments according to the invention create an efficient and secured device specific communication in multi-site DUT tests.

According to an aspect of the invention, per-channel processing units are used to transform a central data stream with local device-specific (or with local device specific data).

According to an aspect, an encrypted and device-specific communication can be performed in this manner.

According to another aspect, a communication with the channel processing unit (or channel processing units) is as device-agnostic as possible (e.g., in the sense that characteristics of an individual device under test, like individual encryption keys or individual credentials, are not considered, e.g., in the main data volume communicated between the tester control and the channel processing units)

For example, an automated test equipment according to FIGS. 2A and 2B may be used for this purpose.

In the following, some aspects which relate to the channel processing unit will be described.

According to an aspect, the channel processing unit may transform an incoming tester command stream into device specific communication, for example a secured device communication and/or protocol-aware with local device specific information.

According to an aspect, there central processing unit may use a transparent input-output stream to an external workstation (which may, for example, implement the tester control).

According to an aspect, embodiments according to the invention allow (or perform) a result analysis directly on the channel processing unit, to reduce bus traffic and/or CPU requirements.

According to an aspect, the channel processing unit combines storage (e.g. memory) and computing (e.g. CPU and/or ASIC and/or FPGA).

For example, the channel processing unit according to FIGS. 3A and 3B may be used to implement these aspects.

According to an aspect, the channel processing unit may use sandboxing.

For example, sandboxing may comprise local execution of tester commands with its individual memory and computing capability (with or without resource-sharing depending on architecture).

According to an aspect, the sandbox communicates with the hosting channel processing unit using protected interfaces such that one sandbox is isolated from the other one. In some embodiments, inter-sandbox communication is only possible if specifically allowed (e.g., using a configuration).

According to an aspect, there may be one or more sandboxed per channel.

An example of a channel processing unit using one or more sandboxes is shown in FIGS. 4A and 4B In the following, applications according to aspects of the invention will be described.

According to an aspect, embodiments according to the invention may be used to perform secured device communication.

According to an aspect, device-specific data (e.g., keys, credentials, ids, configuration) are stored in local memory before communication.

According to another aspect, a computing module interacts with DUT interfaces, for example to achieve a protection of communication (e.g., using encryption and/or decryption and/or using package counters and/or using error correction and error identification codes, etc.).

According to an aspect, the implementation of the communication protocol may be in hardware or in software.

An example of a channel processing unit using secured device communication is shown in FIGS. 5A and 5B.

According to an aspect, the secured device communication comprises a credential management.

For example, in a first step, credentials (device-specific or device-identical) are presented to a test flow management.

Moreover, for example in a second step there is an upload to the channel processing unit, which may be performed using a broadcast or using a specific upload to a matching module.

Moreover, according to an aspect, there may be an encryption (e.g., of the credentials) by tester specific credentials known to the CPU (e.g., to the CPU of the tester control and to the CPU of the channel processing units).

An example of an automated test equipment using a credentials management is shown in FIGS. 6A and 6B.

According to an aspect, embodiments according to the invention are adapted to perform a secure multi-site protocol-aware testing.

According to an aspect of the invention, a protocol implementation on a channel processing unit can account for, Packet counters, Handshakes with device-specific content (e.g., id), Efficient non-multisite synchronous protocols-aware communication (e.g., using a local processing of a device-specific part), and/or Implementation of communication standards, such as IEEE1687.x, IEEE 1500, or IEEE 1149.4.

An example of a channel processing unit for secure multi-standard protocol-aware testing is shown in FIGS. 7A and 7B.

According to an aspect, embodiments according to the invention use a local preprocessing of upstream results.

According to an aspect, expected results are stored on the channel processing unit (e.g., in a first step).

According to an aspect, upon test execution, upstream result data is analyzed and pre-processed before transmission on a tester bus interface (e.g., using a signature generation and/or using a test result compression).

This allows multi-site efficient interactive test flow execution.

Figure 8A:
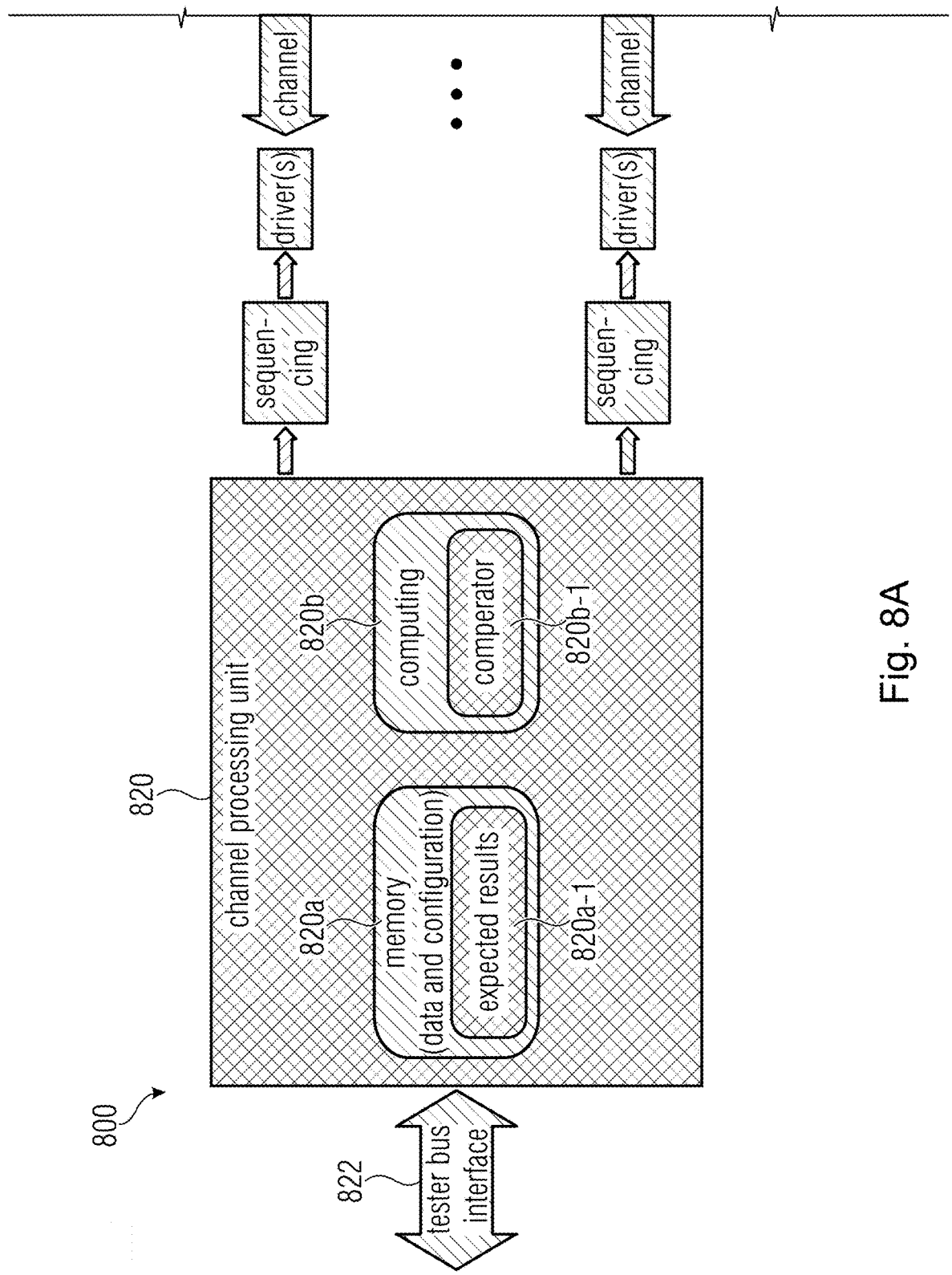
FIG. 8A shows a block schematic diagram of a channel processing unit with preprocessing of upstream result data according to an embodiment of the invention.
Figure 8B:
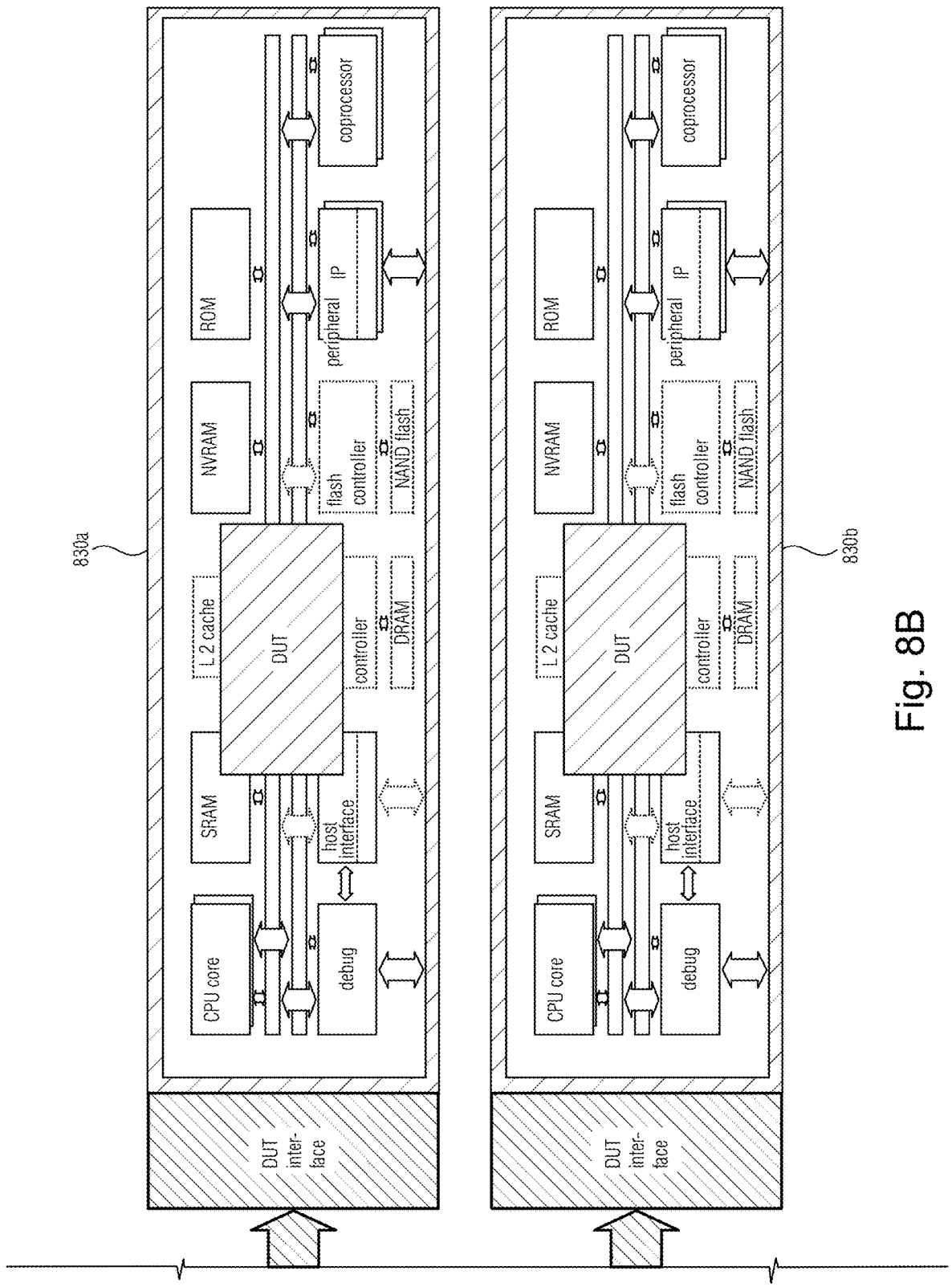
FIG. 8B shows a second block schematic diagram of the channel processing unit with pre-processing of upstream result data according to an embodiment of the invention.

An example of a channel processing unit (or a test chain) using a local preprocessing of upstream results is shown in FIGS. 8A and 8B.

According to another aspect, a customer may upload code to a sandbox.

According to an aspect, a device-specific functionality can be directly executed on the sandboxed channel processing unit as specified by the customer. This enables efficient device-specific computation steps. For example, this enables communication with the specific DfT (design for test) interfaces knowing the device configuration. Moreover, this may allow multi-site efficient interactive test flow execution.

An example of a channel processing unit (or of a test chain) is shown in FIGS. 9A and 9B.

In the following, some advantages of embodiments of the invention over conventional solutions will be discussed. However, it should be noted that it is not necessary that embodiments according to the invention comprise some or all of the advantages mentioned in the following.

According to the embodiments of the present invention, the DUT specific (device-specific) channel processing units which is part of an automated test equipment is disclosed. In other words, embodiments according to the invention solve the problem to improve the communication overhead by introducing DUT specific communication. For example, in a standard approach, multiple DUTs tested in parallel builds the complete processing load in a central processing unit. Whereas the DUT-specific processing is performed in a respective channel processing unit improving the communication overhead over the interface (or data bus).

Embodiments according to the present invention are based on the secure communication approach in order to achieve secure multi-site DUT testing by using an advanced security architecture. Security mechanisms rely on encrypted/decrypted DUT communication, or error detection/error correction or authentication mechanism. Moreover, the communication between the DUT and the channel processing unit is, for example, further protected by using packet counters and/or error correction codes and/or error identification codes. This ensures the highest possible security in the context of multi-site testing.

Further, embodiments according to the present invention allow an efficient device-specific communication. In particular, this is achieved by the result analysis approach and the sandboxed channel processing unit approach. For example, in result analysis approach, the respective test result data from the DUT is compared with a common expected result data broadcasted by the tester control in channel processing units. In case, the respective test result (upstream result data) is different from the common expected result data, the respective test result data and/or the difference between the common expected test result data and the respective test result data is compressed and transmitted to the tester control. To conclude, the result analysis approach on channel processing unit minimizes both the test time by reducing the bus traffic and the CPU requirements. In some embodiments, sandboxed channel processing unit is used in which a device-specific functionality can be updated by uploading from a third-party software in order to enable efficient device specific computation steps. For example, customized DUT tests can be executed from a third-party.

To conclude, embodiments according to the invention may be used to test devices under test in an efficient and secured manner, and are therefore advantageous over other concepts.

IMPLEMENTATION ALTERNATIVES

It should be noted that the memory described herein (and shown in the Figures) may, for example, be implemented as volatile (e.g. using RAM, DDR, embedded memory, etc.) and/or as non-volatile (e.g. using SSD, HDD, Flash, etc.).

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine-readable carrier.

Other embodiments comprise the computer program for performing one of the methods described herein, stored on a machine-readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The invention claimed is:

1. An automated test equipment for testing a plurality of devices under test (DUTs), the automated test equipment comprising:
   a tester control, coupled to a plurality of channel processing units, wherein the tester control is configured to output DUT-agnostic input data and DUT-specific data to the plurality of channel processing units, and wherein a data volume of the DUT-specific data is less than the DUT-agnostic input data; and
   the plurality of channel processing units each configured for testing a respective set of the plurality of DUTs, to the plurality of channel processing units including:
      a first channel processing unit coupled to a first DUT by a first set of one or more communication channels and a second DUT by a second set of one or more communication channels;

the first channel processing unit configured to receive the DUT-agnostic input data and receive the DUT-specific data specific to the first DUT and the DUT-specific data specific to the second DUT, from the tester control;

the first channel processing unit configured to transform the DUT-agnostic input data using the DUT-specific data specific to the first DUT to obtain DUT-adapted data specific to the first DUT and to transform the DUT-agnostic input data using the DUT-specific data specific to the second DUT to obtain DUT-adapted data specific to the second DUT;

the first channel processing unit further configured to output the DUT-adapted data specific to the first DUT across the first set of one or more communication channels to the first DUT and to output the DUT-adapted data specific to the second DUT across the second set of one or more communication channels to the second DUT;

the first channel processing unit further configured to receive DUT-test data specific to the first DUT across the first set of one or more communication channels from the first DUT and to receive DUT-test data specific to the second DUT across the second set of one or more communication channels from the second DUT;

the first channel process unit further configured to process the DUT-test data specific to the first DUT using the DUT-specific data specific to the first DUT and to process the DUT-test data specific to the second DUT using the DUT-specific data specific to the second DUT;

a second channel processing unit coupled to a third DUT by a third set of one or more communication channels and a fourth DUT by a fourth set of one or more communication channels;

the second channel processing unit configured to receive the DUT-agnostic input data and receive the DUT-specific data specific to the third DUT and the DUT-specific data specific to the fourth DUT, from the tester control;

the second channel processing unit configured to transform the DUT-agnostic input data using the DUT-specific data specific to the third DUT to obtain DUT-adapted data specific to the third DUT and to transform the DUT-agnostic input data using the DUT-specific data specific to the fourth DUT to obtain DUT-adapted data specific to the fourth DUT;

the second channel processing unit further configured to output the DUT-adapted data specific to the third DUT across the third set of one or more communication channels to the third DUT and to output the DUT-adapted data specific to the fourth DUT across the fourth set of one or more communication channels to the second DUT;

the second channel processing unit further configured to receive DUT-test data specific to the third DUT across the third set of one or more communication channels from the third DUT and to receive DUT-test data specific to the fourth DUT across the fourth set of one or more communication channels from the second DUT;

the second channel process unit further configured to process the DUT-test data specific to the third DUT using the DUT-specific data specific to the third DUT and to process the DUT-test data specific to the fourth DUT using the DUT-specific data specific to the fourth DUT.

2. The automated test equipment according to claim 1, wherein the tester control is configured to broadcast the DUT-agnostic input data to the plurality of channel processing units by a tester interface.

3. The automated test equipment according to claim 1, wherein at least one of the plurality of channel processing units comprises one or more sandboxes, where the one or more sandboxes are configured to perform one or more functions selected from a group consisting of:
execute commands with individual memory,
transform the DUT-agnostic input data using the DUT-specific data, and
analyze the DUT-test data received from one or more of the plurality of DUTs.

4. The automated test equipment according to claim 1, wherein at least one of the one of the plurality of channel processing units comprises a plurality of sandboxes configured to communicate with the one of the plurality of channel processing units using one or more protected interfaces wherein different ones of the plurality of sandboxes are isolated from each other.

5. The automated test equipment according to claim 1, wherein at least one of the plurality of channel processing units comprises a plurality of sandboxes configured to execute a device specific functionality using the DUT-specific data.

6. The automated test equipment according to claim 1, wherein at least one of the plurality of channel processing units comprises one or more sandboxes including software to allow for a device specific processing of the DUT-agnostic input data or of the DUT-test data using the one or more sandboxes.

7. The automated test equipment according to claim 1, wherein the plurality of channel processing units are further configured to implement a communication protocol using the DUT-specific data to protect a communication between the one or more channel processing units and the plurality of DUTs.

8. The automated test equipment according to claim 7, wherein the plurality of channel processing units further comprise a computing unit configured to perform one or more functions selected from a group consisting of:
encrypt the DUT-agnostic input data to obtain the DUT-adapted data;
decrypt the DUT-test data;
perform error detection on the DUT-test data;
perform error correction on the DUT-test data;
implement a communication protocol using one or more packet counters, in order to obtain the DUT-adapted data or to evaluate the DUT-test data; and
implement a communication protocol using one or more device specific identifiers, in order to obtain the DUT-adapted data or in order to evaluate the DUT-test data.

9. The automated test equipment according to claim 1, wherein the tester control is further configured to obtain security credentials or keys; and
broadcast the security credentials or keys to the plurality of channel processing units or to specifically upload the security credentials or keys to a respective one of the plurality of channel processing units.

10. The automated test equipment according to claim 1, further comprising a communication protocol implementation in the plurality of channel processing units is configured to use one or more of functions selected from a group consisting of:
one or more packet counters;
handshake with device-specific contents;
synchronous communication; and
implementation of communication standards.

11. The automated test equipment according to claim 1, wherein the plurality of channel processing units are further configured to perform one or more functions from a group consisting of:
store an upstream result data;
analyze the upstream result data;
pre-process the upstream result data; and
transmit pre-processed or compressed upstream result data to the tester control.

12. The automated test equipment according to claim 1, wherein:
the tester control is configured to provide common data to the plurality of channel processing units; and
different ones of the plurality of channel processing units are further configured to transform the DUT-agnostic input data into different DUT-adapted data using different DUT-specific data, and to use the different DUT-adapted data for testing different ones of the plurality of DUTs.

13. The automated test equipment according to claim 1, further comprising:
wherein the tester control is configured to provide common expected result data to the plurality of channel processing units; and
wherein different ones of the plurality of channel processing units are further configured to extract respective result data from the respective DUT-test data using the respective DUT-specific data, and to compare the respective result data with the common expected result data, to obtain respective test results associated with the respective DUTs.

14. A method of testing a plurality of devices under test (DUTs) in an automated test equipment comprising a tester control and one or more channel processing units, the method comprising:
transforming, in the one or more channel processing units, DUT-agnostic input data using DUT-specific data, to obtain DUT-adapted data for testing respective DUTs of the plurality of DUTs coupled to respective channel processing units, wherein the DUT-specific data includes one or more of a key, a credential, an identifier, and a configuration;
outputting, from the respective channel processing units, the DUT-adapted data to the respective DUTs coupled to the respective channel processing units, wherein each of the one or more channel processing units is coupled to two or more of the plurality of DUTs, and wherein each of the plurality of DUTs is coupled to a respective one of the one or more channel processing units by a respective DUT-specific communication channel;
receiving DUT-test data from the respective DUTs by the respective channel processing units; and
processing, in the respective channel processing units, the DUT-test data using the DUT-specific data, to test the respective DUTs.

15. The method of testing according to claim 14, further comprising:
communicating the DUT-adapted data from the one or more channel processing units to the respective DUTs using respective device specific channels; and
communicating the DUT-test data from the respective DUTs to the respective channel processing units using the respective device specific channels.

16. The method of testing according to claim 14, further comprising: broadcasting the DUT-agnostic input data from the tester control to the one or more channel processing units by a tester interface.

17. The method of testing according to claim 14, further comprising:
communicating with the one or more channel processing units using one or more protected interfaces of one or more sandboxes of respective ones of the one or more channel processing units wherein different ones of the one or more sandboxes are isolated from each other.

18. The method of testing according to claim 14, further comprising: implementing a communication protocol using the DUT-specific data to protect a communication between the one or more channel processing units and the plurality of DUTs.

19. The method of testing according to claim 14, further comprising:
obtaining, by the tester control, security credentials or keys; and
broadcasting the security credentials or keys from the tester control to the one or more channel processing units or specifically uploading the security credentials or keys from the tester control to a respective one of the one or more channel processing units.

20. One or more non-transitory computing device readable media storing computing device executable instructions that when executed by one or more computing units perform a method comprising:
transforming, in one or more channel processing units, DUT-agnostic input data using device under test-specific data, to obtain device-under-test-adapted data for testing respective devices under test (DUTs) of a plurality of DUTs, wherein the DUT-specific data includes one or more of a key, a credential, an identifier, and a configuration, and wherein a data volume of the DUT-specific data is less than the DUT-agnostic input data;
outputting, from the one or more channel processing units, the DUT-adapted data to the respective DUTs;
receiving DUT-test data, by the one or more channel processing units; and
processing, in the one or more channel processing units, the DUT-test data using the DUT-specific data, to test the respective DUTs.

21. The one or more non-transitory computing device readable media storing computing device executable instructions that when executed by one or more computing units perform the method to claim 20, further comprising:
communicating the DUT-adapted data from the one or more channel processing units to the respective DUTs using respective device specific channels.

22. The one or more non-transitory computing device readable media storing computing device executable instructions that when executed by one or more computing units perform the method to claim 21, further comprising:
communicating the DUT-test data from the respective DUTs to the respective channel processing units using the respective device specific channels.

23. The one or more non-transitory computing device readable media storing computing device executable instructions that when executed by one or more computing units perform the method to claim 20, further comprising:
communicating with the one or more channel processing units using one or more protected interfaces of one or more sandboxes of respective ones of the one or more channel processing units wherein different ones of the one or more sandboxes are isolated from each other.

\* \* \* \* \*

UNITED STATES PATENT AND TRADEMARK OFFICE
CERTIFICATE OF CORRECTION

| | | |
|---|---|---|
| PATENT NO. | : 12,467,969 B2 | Page 1 of 1 |
| APPLICATION NO. | : 18/074325 | |
| DATED | : November 11, 2025 | |
| INVENTOR(S) | : Matthias Sauer et al. | |

It is certified that error appears in the above-identified patent and that said Letters Patent is hereby corrected as shown below:

In the Claims

In Column 24, Line 20, in Claim 4, delete "one of the one of the" and insert -- one of the --.

In Column 25, Line 32, in Claim 13, delete "units;" and insert -- units: --.

Signed and Sealed this
Third Day of February, 2026

John A. Squires
*Director of the United States Patent and Trademark Office*